US010852913B2

(12) United States Patent
Yoganandan et al.

(10) Patent No.: US 10,852,913 B2
(45) Date of Patent: Dec. 1, 2020

(54) REMOTE HOVER TOUCH SYSTEM AND METHOD

(71) Applicant: Samsung Electronics Co., Ltd., Suwon-si (KR)

(72) Inventors: Arun Rakesh Yoganandan, Mountain View, CA (US); Stacie Hibino, Mountain View, CA (US); Chang Long Zhu Jin, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/581,412

(22) Filed: Apr. 28, 2017

(65) Prior Publication Data

US 2017/0364198 A1 Dec. 21, 2017

Related U.S. Application Data

(60) Provisional application No. 62/352,957, filed on Jun. 21, 2016.

(51) Int. Cl.
*G06F 3/0482* (2013.01)
*G06F 3/0346* (2013.01)
(Continued)

(52) U.S. Cl.
CPC ......... *G06F 3/0482* (2013.01); *G02B 27/017* (2013.01); *G06F 1/163* (2013.01);
(Continued)

(58) Field of Classification Search
CPC ......... G06F 3/012; G06F 3/013; G06F 3/0416
See application file for complete search history.

(56) References Cited

U.S. PATENT DOCUMENTS 5,703,623 A * 12/1997 Hall ............... G06F 3/0346
345/156
6,031,531 A * 2/2000 Kimble ............ G06F 3/04812
340/4.1
(Continued)

FOREIGN PATENT DOCUMENTS

EP 2293176 A2 3/2011
EP 3001407 A1 3/2016
(Continued)

OTHER PUBLICATIONS

International Search Report from International Application No. PCT/KR2017/005778 dated Sep. 14, 2017.
(Continued)

*Primary Examiner* — Alexander Eisen
*Assistant Examiner* — Nathaniel P Brittingham

(57) ABSTRACT

A controller includes a touch sensor and a proximity sensor. Information on when and where a user touches the surface of the touch sensor is detected. Additionally, information on pre-touch events is detecting. The pre-touch events correspond to a user's finger hovering over the touch sensor within some maximum depth. A display device generates visualizations based on the hover events and the touch events. This can include providing visual feedback in a hover mode where a user's finger is, relative to the touch sensor. Additionally, various forms of navigation information may be provided in the hover mode, as well as other control information.

19 Claims, 34 Drawing Sheets

(51) Int. Cl.
*G06F 3/0484* (2013.01)
*G06F 3/0488* (2013.01)
*G06F 3/042* (2006.01)
*G06F 3/044* (2006.01)
*G06F 3/01* (2006.01)
*G06F 1/16* (2006.01)
*G06F 3/023* (2006.01)
*G06F 3/0481* (2013.01)
*G02B 27/01* (2006.01)

(52) U.S. Cl.
CPC .......... *G06F 1/1626* (2013.01); *G06F 1/1694* (2013.01); *G06F 3/011* (2013.01); *G06F 3/0236* (2013.01); *G06F 3/0346* (2013.01); *G06F 3/042* (2013.01); *G06F 3/044* (2013.01); *G06F 3/0488* (2013.01); *G06F 3/04815* (2013.01); *G06F 3/04842* (2013.01); *G06F 3/04845* (2013.01); *G06F 2203/04101* (2013.01); *G06F 2203/04108* (2013.01)

(56) References Cited

U.S. PATENT DOCUMENTS

| | | | |
|---|---|---|---|
| 7,475,351 B1* | 1/2009 | Johnson | H04L 41/0873 715/736 |
| 8,681,124 B2 | 3/2014 | Bamji et al. | |
| 8,769,431 B1* | 7/2014 | Prasad | G06F 3/048 715/788 |
| 8,878,821 B2 | 11/2014 | Robinson et al. | |
| 8,976,131 B2 | 3/2015 | Homma et al. | |
| 9,092,129 B2 | 7/2015 | Abdo et al. | |
| 9,116,598 B1 | 8/2015 | Yoden | |
| 9,182,838 B2 | 11/2015 | Kikkeri | |
| 9,274,606 B2 | 3/2016 | Yee | |
| 2004/0218104 A1* | 11/2004 | Smith | G06F 3/017 348/734 |
| 2008/0267454 A1* | 10/2008 | Kobayashi | G01B 11/14 382/106 |
| 2008/0313538 A1* | 12/2008 | Hudson | G06F 3/04886 715/702 |
| 2009/0002218 A1* | 1/2009 | Rigazio | G08C 17/00 341/176 |
| 2009/0040175 A1* | 2/2009 | Xu | G06F 3/0346 345/156 |
| 2009/0262074 A1* | 10/2009 | Nasiri | A63F 13/06 345/158 |
| 2009/0289914 A1* | 11/2009 | Cho | G06F 3/044 345/173 |
| 2010/0306710 A1* | 12/2010 | Poot | G06F 3/017 715/856 |
| 2011/0134030 A1* | 6/2011 | Cho | G06F 3/03547 345/157 |
| 2012/0144076 A1* | 6/2012 | Yang | G06F 3/0346 710/63 |
| 2012/0212438 A1 | 8/2012 | Vaisanen | |
| 2012/0223882 A1* | 9/2012 | Galor | G06F 3/017 345/157 |
| 2012/0242581 A1* | 9/2012 | Laubach | G06F 3/04812 345/168 |
| 2012/0254808 A1 | 10/2012 | Gildfind | |
| 2012/0320158 A1 | 12/2012 | Junuzoyic et al. | |
| 2013/0127731 A1* | 5/2013 | Song | G06F 3/017 345/169 |
| 2013/0271404 A1* | 10/2013 | Choi | G06F 3/01 345/173 |
| 2013/0342456 A1* | 12/2013 | Choi | G06F 3/017 345/158 |
| 2014/0111483 A1 | 4/2014 | Harrison et al. | |
| 2014/0157201 A1* | 6/2014 | Ronkainen | G06F 3/0488 715/835 |
| 2014/0240255 A1 | 8/2014 | Kim et al. | |
| 2015/0019988 A1 | 1/2015 | Costenaro et al. | |
| 2015/0023650 A1* | 1/2015 | Austin | H04N 21/4314 386/241 |
| 2015/0043770 A1* | 2/2015 | Chen | G06K 9/00208 382/103 |
| 2015/0084866 A1* | 3/2015 | Thomas | G06F 3/03547 345/158 |
| 2015/0103032 A1 | 4/2015 | Bell | |
| 2015/0109257 A1* | 4/2015 | Jalali | G06F 3/0488 345/175 |
| 2015/0264583 A1* | 9/2015 | Sundstrom | H04W 16/28 342/373 |
| 2016/0054802 A1 | 2/2016 | Dickerson et al. | |
| 2016/0054807 A1* | 2/2016 | Flagg | G06F 3/017 345/158 |
| 2016/0117081 A1* | 4/2016 | Pujia | G06F 3/04842 715/771 |
| 2016/0328031 A1* | 11/2016 | Moon | G06F 3/01 |
| 2017/0053443 A1* | 2/2017 | Diament | G06F 3/044 |
| 2017/0068418 A1* | 3/2017 | Tanaka | G06F 3/0488 |
| 2017/0364198 A1* | 12/2017 | Yoganandan | G06F 3/0346 |
| 2018/0096519 A1* | 4/2018 | Tokubo | G06T 15/205 |
| 2019/0005571 A1* | 1/2019 | Cho | G06F 3/048 |

FOREIGN PATENT DOCUMENTS

KR  10-2009-0121033 A   11/2009
KR     10-1517001 B1    4/2015

OTHER PUBLICATIONS

Written Opinion from International Application No. PCT/KR2017/005778 dated Sep. 14, 2017.
European Patent Office, "Supplementary European Search Report," Application No. EP 17815621.2, dated Apr. 2, 2019, 9 pages.
Notification of Reason for Refusal in connection with Korean Application No. 10-2019-7001978 dated Jun. 29, 2020, 15 pages.

* cited by examiner

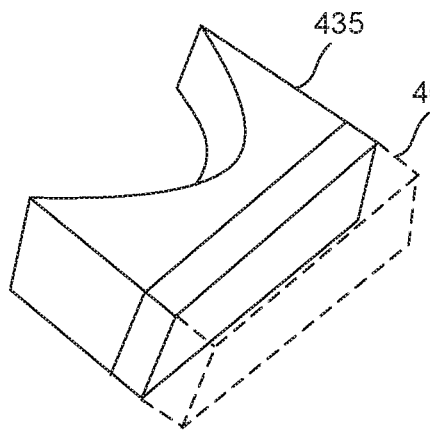
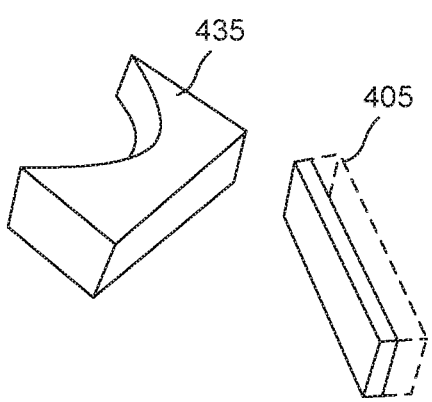
FIG. 4A        FIG. 4B
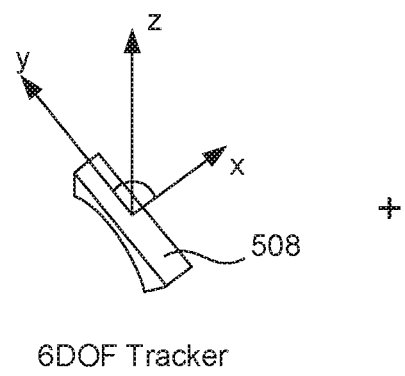
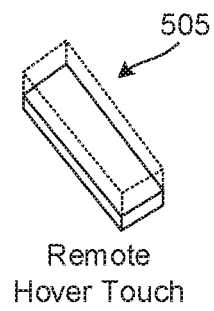
6DOF Tracker           Remote Hover Touch
FIG. 5A                FIG. 5B
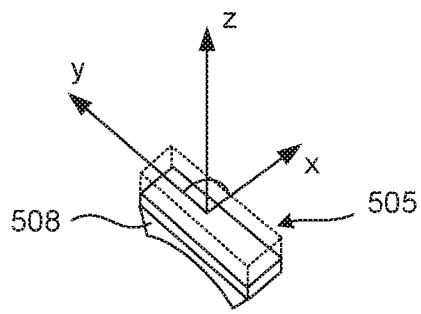
6DOF Remote Hover Touch
FIG. 5C Top Left Top Right Bottom Left Bottom Right Hover UI Shows Hidden Elements on Hover Hover Touch and Slide to Reach Hidden Elements Touch Hidden Element Selected Touch

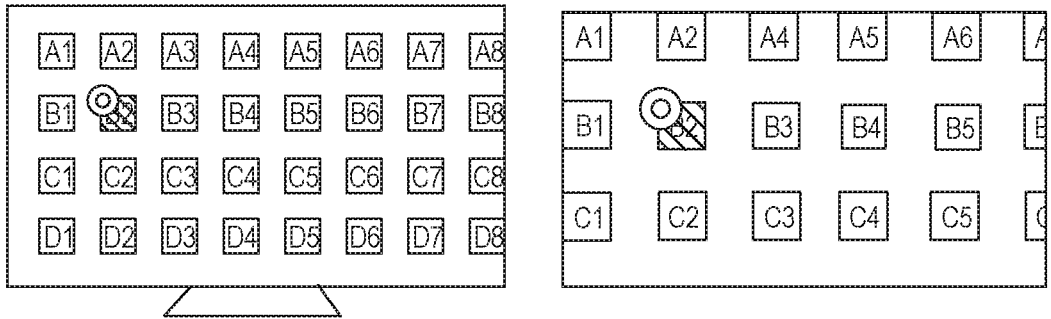
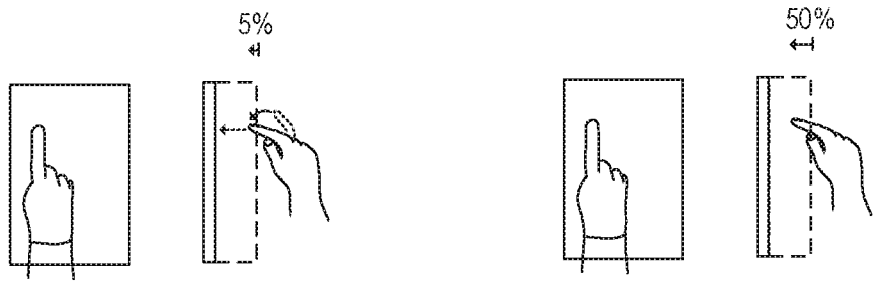
FIG. 14A  FIG. 14B
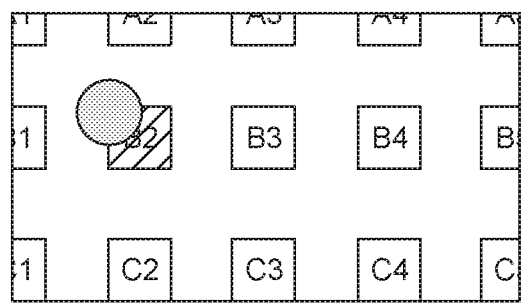
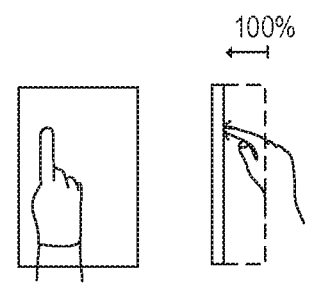
FIG. 14C

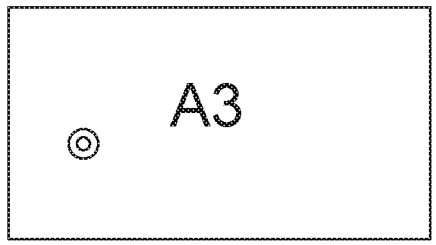
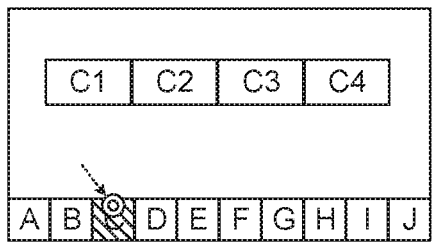
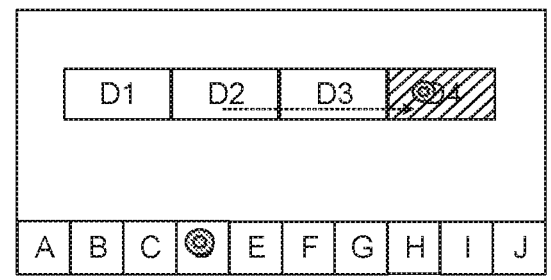
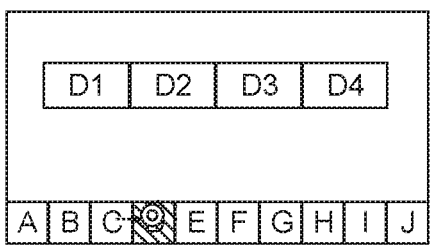
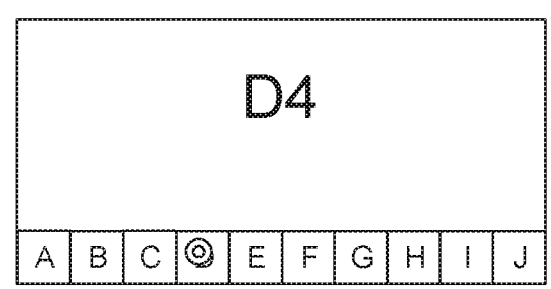
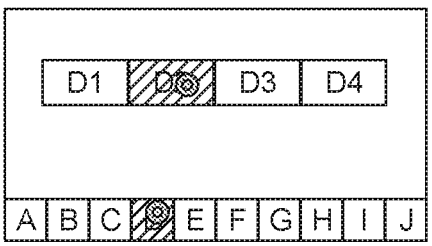
FIG. 16B
FIG. 16A Hover Touch Hover Touch

REMOTE HOVER TOUCH SYSTEM AND METHOD

CROSS REFERENCE TO RELATED APPLICATIONS

The present application claims the benefit of Provisional Application No. 62/352,957 filed Jun. 21, 2016 entitled "A System and Method for Hover+Touch Interactions with Remote Displays" the contents of which are hereby incorporated by reference.

FIELD OF THE INVENTION

An embodiment of the present invention is generally related to utilizing a hover touch user interface.

BACKGROUND OF THE INVENTION

A variety of displays of varying forms and sizes have limitations on the user interface interactions that they support. In particular, many types of direct touch interactions are not supported. For example, television monitors and Head Mounted Displays (HMDs) are not well suited for direct touch interaction. There are several reasons for this. One reason is proximity Televisions are typically viewed at a comfortable viewing distance away from the user, which is typically too far away to allow direct touch interaction. For example, in a living room environment, a television may be located across the room from where people are seated, such that it would be highly inconvenient for a user to walk up to the television display and touch the screen.

Moreover, many other types of displays, such as computer monitors and kitchen monitors, are kept at a comfortable viewing distance that is far enough that direct touch interaction would cause discomfort and fatigue with extended use. For example, a computer monitor located at an arm's length away might be touched but it would not be comfortable, in an ergonomic sense, for a user to hold their arm up for an extended period of time to engage in a series of direct touch interactions.

On the other hand, some Head Mounted Displays (HMDs) are too close in the sense that they are so close to the user's face that the surface of the display is not available for touch interactions. In particular, a variety of user interface interactions are not supported by conventional remote display or Virtual Reality (VR) goggles. For example, in VR systems, the users cannot directly see their hands (or hand held input devices) while wearing VR goggles. This severely limits the variety and quality of interactions that the user can perform. Even when the user's hands are visible in Augmented Reality (AR) and Mixed Reality (MR) goggles, performing all virtual world interactions with free hand input and gestures is cumbersome. Additionally, alphanumeric input is especially tough to do with free hand input.

The alternatives to direct on-screen touch input also have limitations. For example, traditional remote controllers and game controllers may have buttons, d-pads, knobs, joysticks and other physical input elements. For simple tasks such as surfing channels, inputting a channel number, turning left with a joystick etc, these types of remotes and game controllers work fine. However, they generally fail in regards to more advanced user interface functions. One of the main issues associated with them is the explosion of number of buttons as the choices and functions increase, making them cumbersome. Alternatively, buttons get overloaded with multiple functions, which brings about the problem of remembering combinations such as ctrl+shft etc. Finally, they are typically not well suited for direct spatial input.

Touch remotes with track pads are another option, but they have their own set of problems. One problem is the dislocation of the display with the touch surface. Users do not know where they are going to touch, until they make their first touch. Additionally, since remotes are usually small, their touch surfaces are small as well, making them less suitable for direct spatial selection. For example, most touch remotes only support indirect spatial input such as move left, move top etc., which makes them equivalent to a D-pad.

Remotes with motion tracked input allow orientation and/or position to be used as inputs to a user interface. For example, there are remotes that offer 3 degrees of freedom and 6 degrees of freedom. However, these types of remotes perform poorly for alpha numeric and textual inputs and have other drawbacks.

Second screen devices are sometimes used as digital remote controls and input devices for displays. They are typically used in two different ways. Screen mirroring devices use a second screen device to mirror a primary screen on the second screen. Sometimes a second screen device uses a simplified screen with a simplified interface that is different from the primary screen and achieves the effect similar to a digital remote. However, second screen devices suffer from divided attention. Much of the user's time is spent in shifting their view back and forth between the screens, affecting the viewing experience. There are also other major issues such as loss of context and frequent refocus of the eye due to differences in distance etc.

BRIEF DESCRIPTION OF THE DRAWINGS

FIGS. 4A and 4B illustrate a hover touch controller detachable attached to a head mounted display in accordance with an embodiment.

FIGS. 5A, 5B, and 5C illustrate aspects of a hybrid device in which a 6 degree of freedom tracker is combined with a hover touch controller in accordance with an embodiment.

FIGS. 14A, 14B, and 14C illustrate an example of using a hover mode to implement a push-to-zoom feature in accordance with an embodiment.

FIGS. 16A and 16B illustrate a distributed touch feature in accordance with an embodiment.

DETAILED DESCRIPTION

Figure 1:
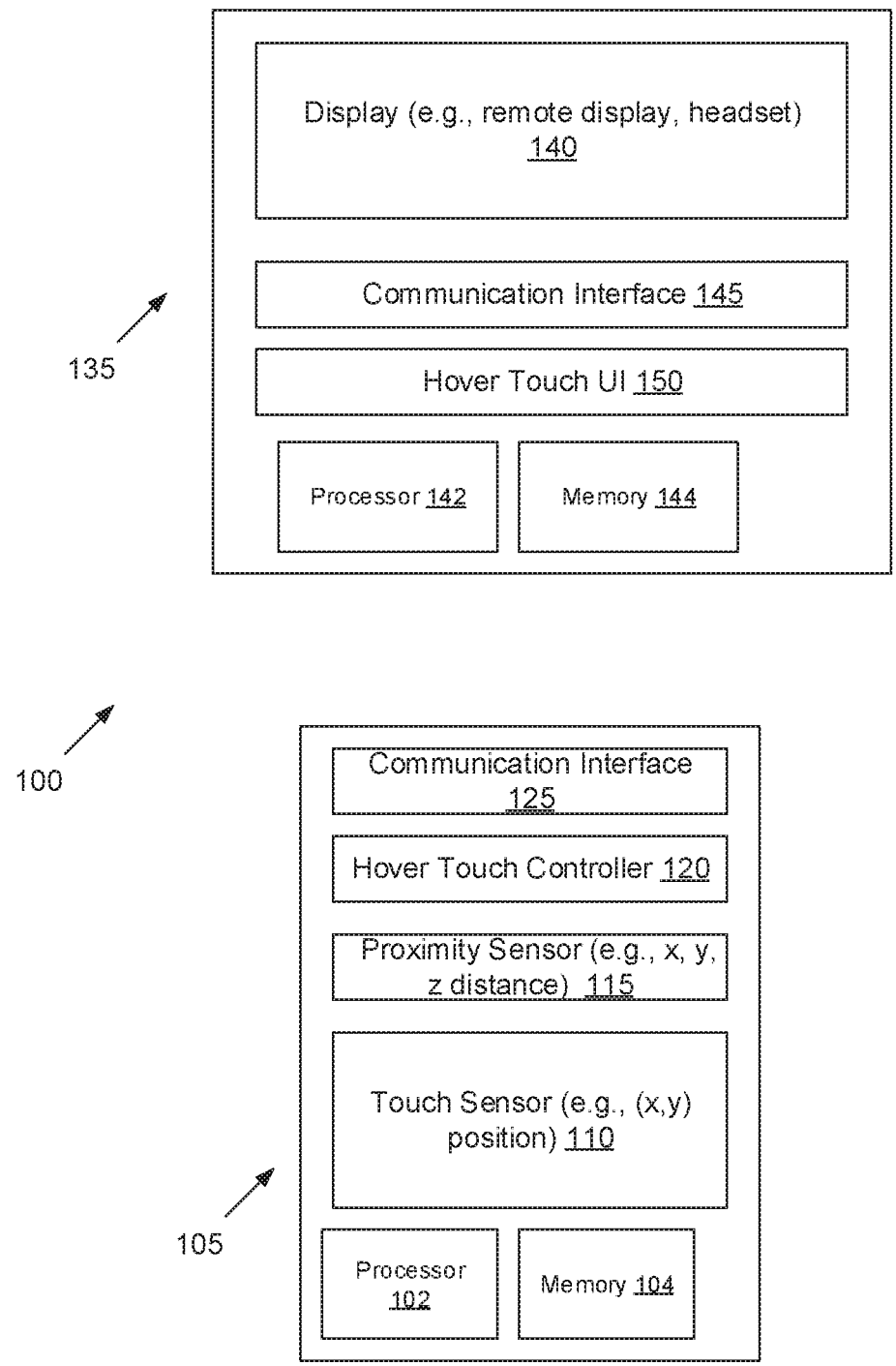
FIG. 1 illustrates a system combining hover and touch operations in accordance with an embodiment.

FIG. 1 illustrates an embodiment of a system 100 directed to combining hover and touch user interface controller operations. In one embodiment, a hover touch controller device 105 includes a touch sensor 110 and may also include at least one processor 102 and a memory 104. For example, the at least one processor 102 may include one or more computer processors, microprocessors, or a microcontroller. The memory 104 may include a data storage device supporting program instruction. The at least one processor 102 can be configured by the instructions to function as a special purpose processor to perform one or more methods described herein. The touch sensor has a two-dimensional surface and may provide two-dimensional (e.g., (x,y)) information on a point of contact of an interaction device, such as a stylus, a user's finger. etc., with the surface of the touch sensor 110. The touch sensor provides "touch" information (a "touch mode") when an interaction device, such as a user's finger, touches down on the surface of the touch sensor.

In one embodiment, a proximity sensor 115 senses a position of the user's finger (or other interaction device) from the touch sensor 110 within a three dimensional volume (e.g. a position that the user's finger hovers above the surface of the touch sensor 110). The proximity sensor provides information on when and where the user's finger is hovering around the touch sensor within the three dimensional volume. This information may be described as "pre-touch" or a "hover" or "hover mode." For example, the user's finger may hover above the surface of the touch sensor prior to touching down on the surface of the touch sensor.

The hover touch controller device 105 is an input device for a user to enter inputs for a display device. In embodiments in which it is used to control a remote display device, the hover touch controller may also be called a "remote."

A hover touch controller 120 coordinates the operation of the touch sensor 110 and proximity sensor 115 to generate information on the position of a user's finger relative to the touch surface. This may include information indicating that the user's finger has touched the surface of the touch sensor 110 and a position relative to the two-dimensional surface of the touch sensor 110, such as (x,y) information; and information on a distance, distance range, or relative distance of the user's finger above the surface of the touch sensor 110 (e.g., (x, y, z) information describing a position above the surface of the touch sensor, which can also be describe as "hover" or a "hover mode). Thus, information is generated describing "touch" interactions and "hover" interactions.

This information is communicated via a communication interface 125 to a display device 135. The display device 135 includes a display 140, communication interface 145 to communicate with a hover touch controller device, hover touch user interface 150, a processor 142, and a memory 144.

The display device 135 may be implemented as a remote display, such as a television or computer display. However, as described below in more detail, in some embodiments the display may be implemented as part of a headset display device, such as VR goggles. Moreover, as descried, below, in some embodiments, the hover touch controller device 105 may be implemented as a unit attached to a headset display device. Additionally, in some embodiments, the hover touch controller device 105 may be utilized in combination with another tracking device, such as a 6 degree of freedom tracker.

Figure 2:
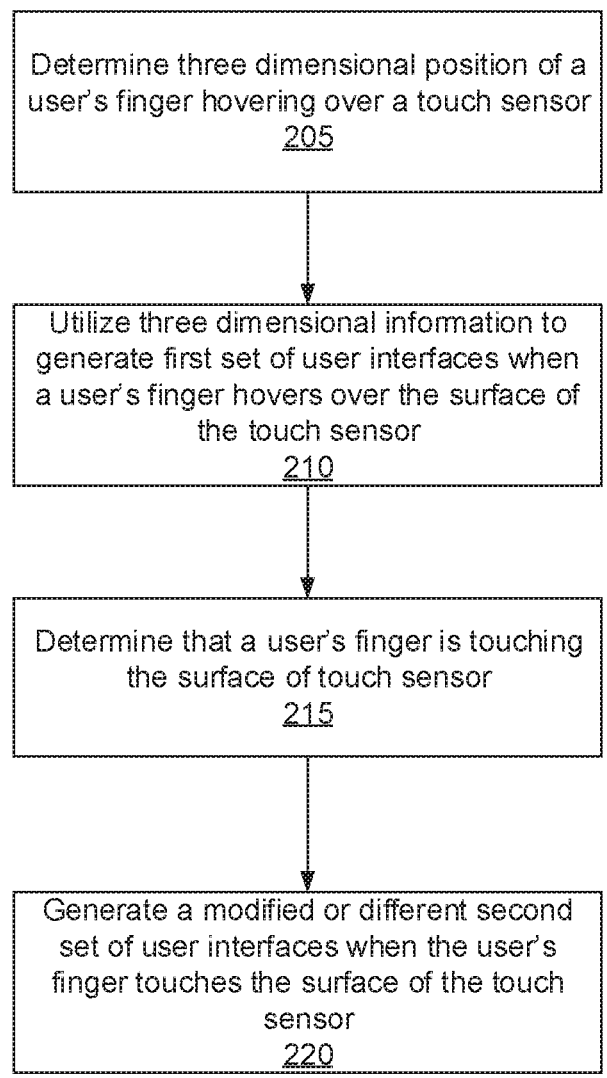
FIG. 2 illustrates a method of adapting a user interface based on touch and near-touch interactions of a touch sensor in accordance with an embodiment.

FIG. 2 is a flowchart illustrating a general method in accordance with an embodiment. Hover touch UI 150, based on information received from hover touch controller device 105, generates user interfaces presented at the display 140. In one embodiment, the hover touch UI 150, based on information received from the hover touch controller device 105, determines at block 205 when a user's finger hovers over a surface of the touch sensor 110 but does not touch it. A first set of user interface features is generated at block 210 in a hover mode based on a position (including a distance, distance range or relative of the user's finger above the surface of the touch sensor 110).

The hover touch UI 150 determines at block 215 when the user's finger touches the surface of touch sensor 110. A second set of UI features are generated at block 220 in the touch mode, which are modified or different versions of the first set of UI features in the hover mode.

In one embodiment, the first set of features (in the hover mode) provides a visualization indicative of a pre-touch event. As an illustrative example, UI navigation visualizations may be generated in the hover mode to assist the user to select features in the touch down mode. This allows visual feedback not just for touch events, but also pre-touch interactions. As described below in more detail, various embodiments include generating user interface features, when the user's finger hovers over the surface (but does not touch it) which aid the user to navigate the user interface and touch the correct portion of the surface. Examples include, hidden user interface elements that are revealed in a hover mode interaction to reduce clutter, scaling the user interface in a hover mode to increase the precision of an interaction, scaling of the UI in the hover mode, and scaling an associated window based on distance of hover to preview media. Other examples include using a hover mode in combination with a touch mode to emulate multi-touch input interactions.

In one embodiment, a hover mode includes a range of distances above the surface of the touch sensor 110 but within a selected (maximum) distance from the surface. That is, the hover mode corresponds to a user's finger hovering over the surface within a maximum hover depth. However, smaller distances within this hover depth may also be determined. In one embodiment, this is expressed as a normalized value within some maximum depth (e.g., Z/depth) and the normalized value used for user interface control and interaction. However, while the hover depth may be represented as a continuous normalized value, it will also be understood that it may be represented in other formats.

It will be understood that hover touch controller device 105 may be implemented in many different ways. In particular, different techniques to implement a touch sensor 110 and proximity sensor 115 may be utilized. Several variations are illustrated in FIGS. 3A-3E.

Figure 3A:
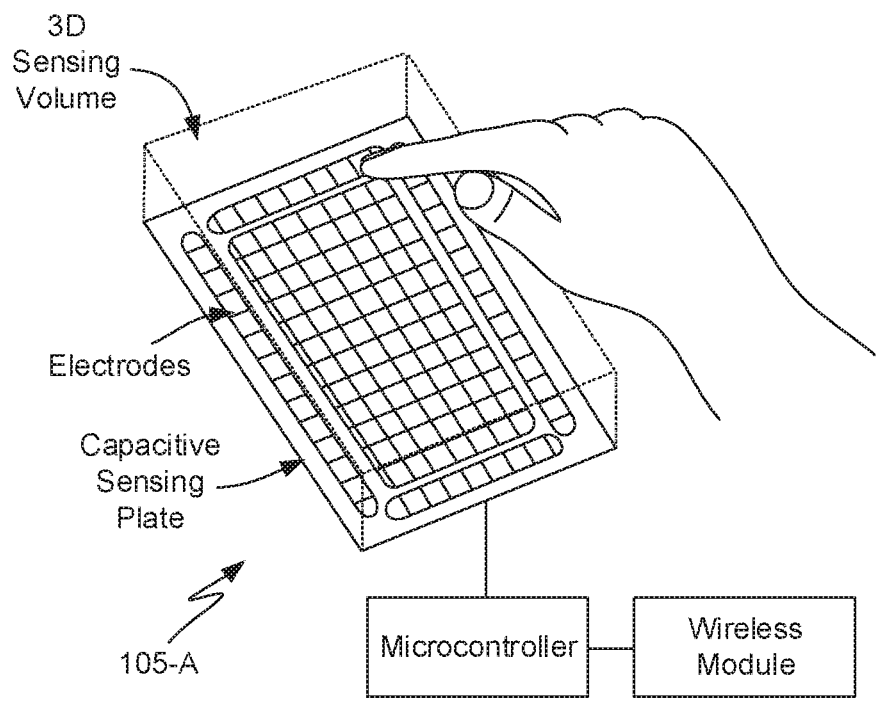
FIG. 3A illustrates an embodiment of a hover touch controller using a capacitive sensing plate in accordance with an embodiment.

FIG. 3A illustrates an embodiment of the hover touch controller device 105-A. In one embodiment, the hover touch controller device 105-A includes a rectangular plate or surface that is a projected capacitive sensor. An electrostatic field is created around the plate, which when perturbed by the presence of a human hand/finger, can be measured. Calibration can be performed to differentiate between measurements for hovering over the plate vs measurements when touching the plate. The two dimensional (x, y) coordinates of interactions points within the plate can be estimated for both hover and touch. Additionally, the height of the interaction point above the plate can also be estimated, resulting in full 3D interaction/tracking above the plate. In one embodiment, a micro controller attached to the plate, reads and processes signals and transmits the results wirelessly via a wireless module such as Bluetooth/WIFI.

Figure 3B:
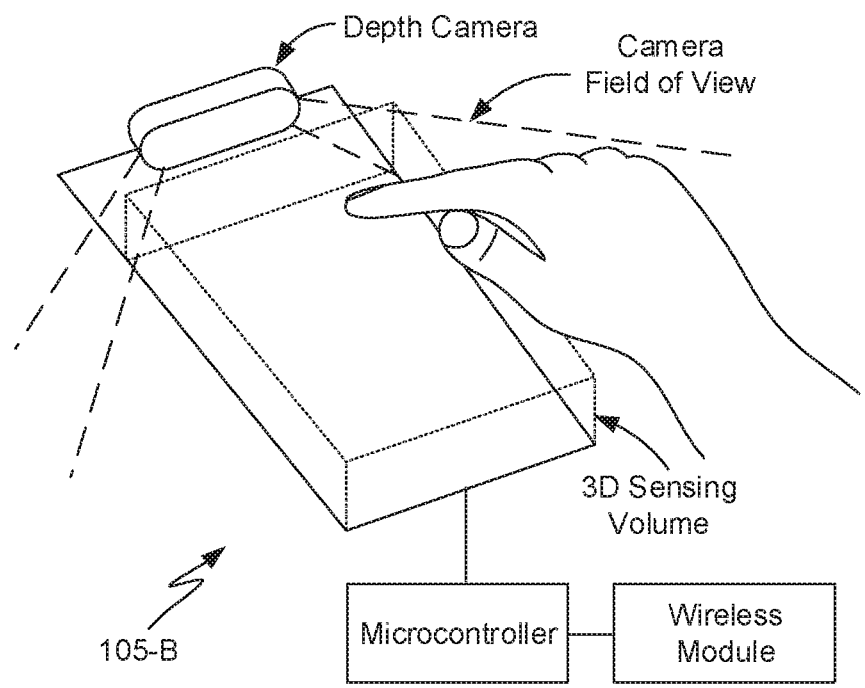
FIG. 3B illustrates an embodiment of a hover touch controller using a depth camera in accordance with an embodiment.

FIG. 3B illustrates another embodiment of the hover touch controller device 105-B in which the controller includes a resistive or a capacitive touch surface that is limited to measuring (x, y) touch positions along the surface. An additional measurement unit is provided to measure z-values of the user's finger. In one embodiment, a depth camera is provided at one end of the plate, which allows to track the fingers in a 3D volume just above the plate. Both the capacitive touch surface and the depth camera are connected to a microcontroller/computing system that puts the data together to provide true 3D tracking. The 3D coordinates and touch information is then relayed via a wireless module.

In an alternate embodiment (not shown), an equivalent interface can be achieved without a capacitive/resistive touch surface using a depth camera or set of depth cameras. For example, a calibrated depth camera mounted on the plate, may be tuned to differentiate between touch and hover.

Figure 3C:
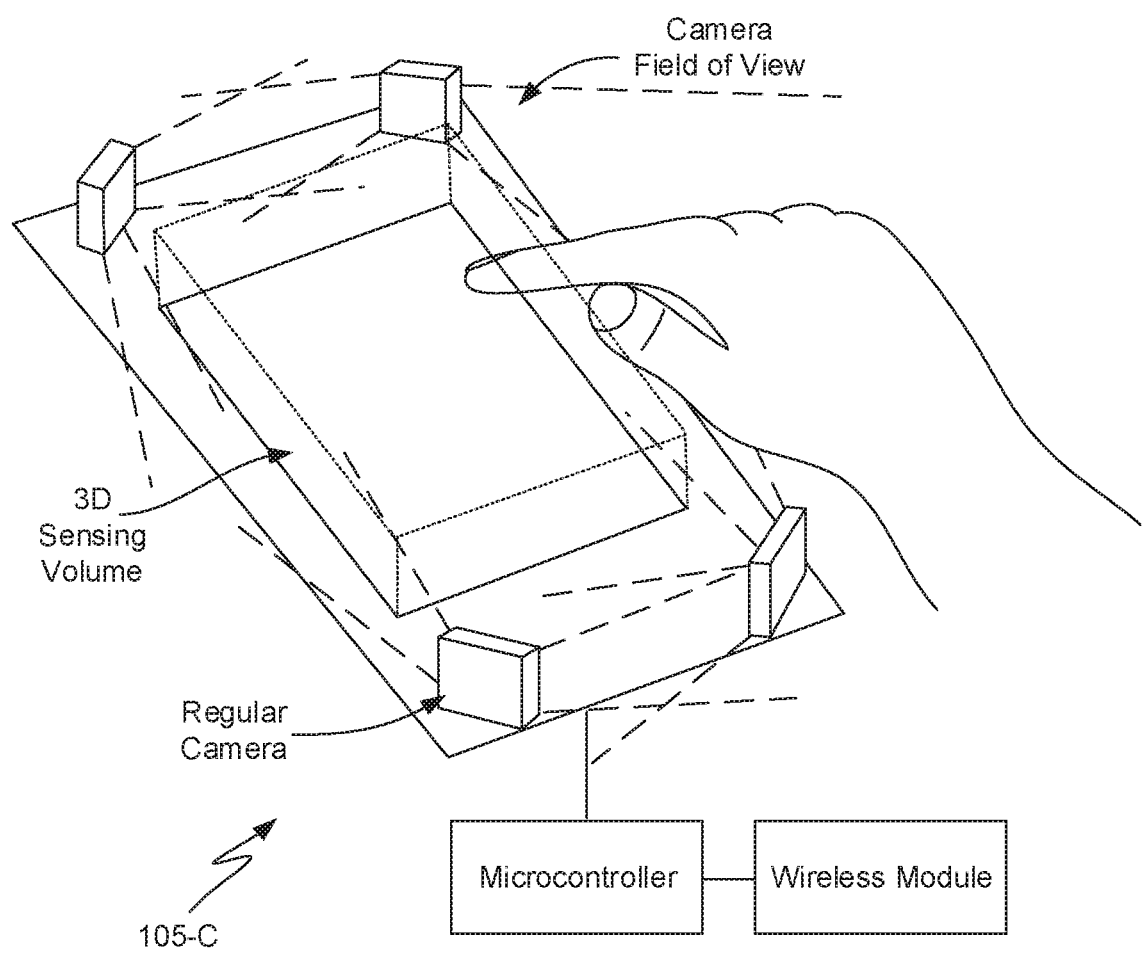
FIG. 3C illustrates an embodiment of a hover touch controller using a camera and reflectors in accordance with an embodiment.

FIG. 3C illustrates an embodiment of the hover touch controller device 105-C that includes a set of cameras spaced about the perimeter of the hover touch controller device. In one embodiment, there is one camera at each corner or at the center of each edge. While the cameras are illustrated above the surface of the controller, more generally the camera may also be embedded flush (or nearly flush) to the surface. Each camera has a wide Field of View (FoV). In one embodiment, a computing device (not shown) then puts together the images from all the cameras and uses computer vision to generate a 3D model of the interacting finger/hand at runtime. Alternately, a machine learning algorithm may be used to estimate the x,y,z position above the surface. The information is then relayed to the display through a wireless module.

Figure 3D:
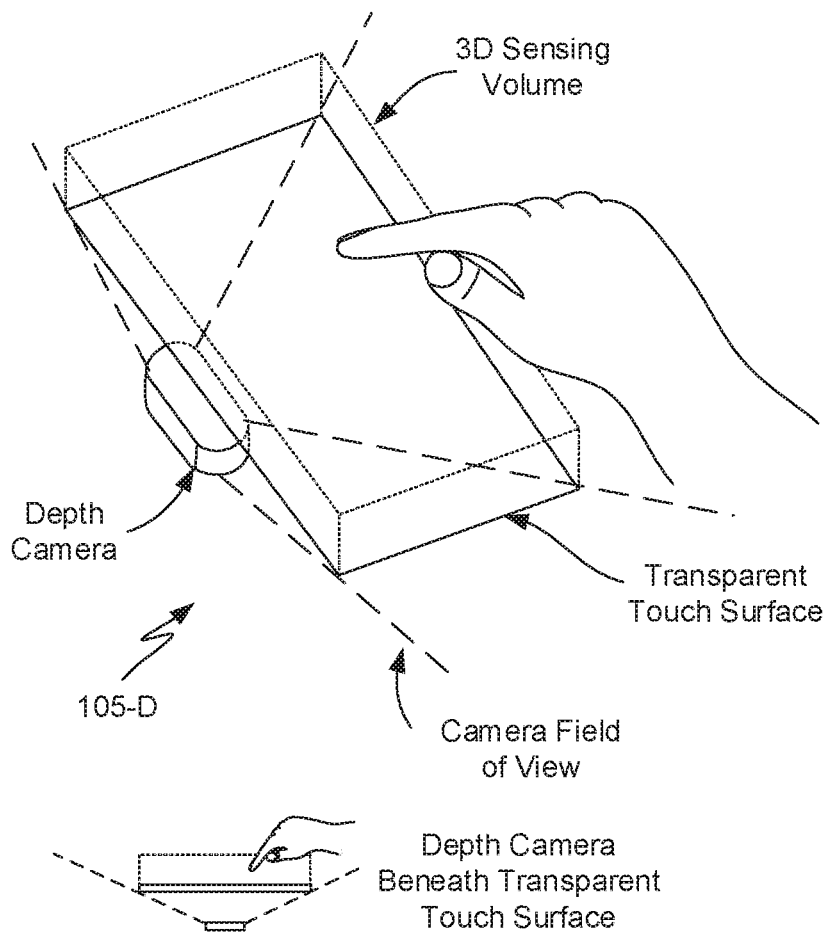
FIG. 3D illustrates an embodiment of a hover touch controller using a depth camera in accordance with an embodiment.

FIG. 3D illustrates an embodiment of a hover touch controller device 105-D in which a depth camera is placed under a transparent resistive or capacitive touch surface. The information from the camera is calibrated to track a 3D volume above the touch surface. The information about hover in the 3D volume and the touch surface is combined together and relayed via a wireless display to the remote display.

Figure 3E:
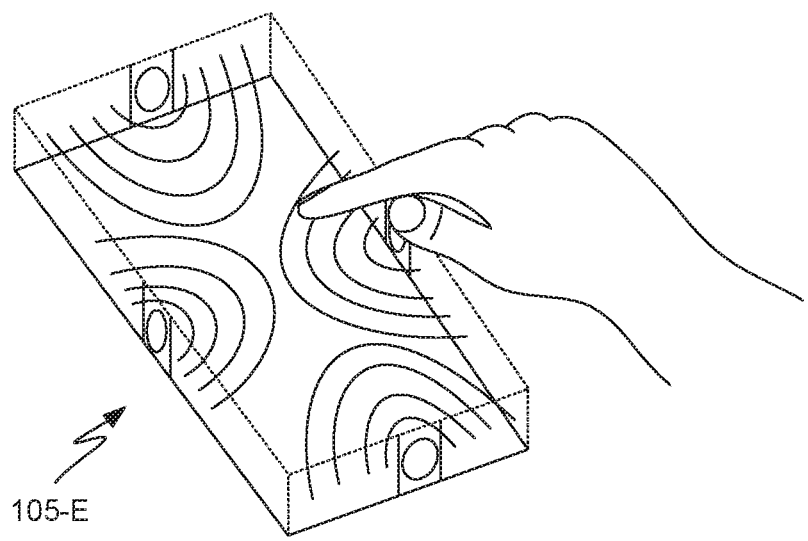
FIG. 3E illustrates an embodiment of a hover touch controller using ultrasound in accordance with an embodiment.

FIG. 3E illustrates an embodiment of a hover touch controller device 105-E that makes use of ultra sound sensors. A plurality of ultrasound sensors are embedded flush with a surface. They are all connected to a micro controller and their signals are processed to provide a 3D tracking volume. Touch estimation is performed either by calibrating to detect when finger is in a touch zone or a transparent touch element is stuck to the surface.

It will also be understood that in some embodiments the hover touch controller device 105 is connected to, attached, or otherwise operating in combination with a head mounted display. FIG. 4A shows an embodiment where the hover touch device controller 405 is collocated with front face of a HMD 435. In one embodiment, the input surface contains wireless modules and processing units of its own, which allows it to be detached from the HMD and used at hand level if need be (FIG. 4B). In one embodiment, the hover touch controller is transparent in order to be able to use it with see through HMDs as well.

Moreover, in some embodiments the hover touch controller device 105 is used in combination with other tracking information, such as information provided by a 6 degree of freedom (6 DOF) controller. FIG. 5A illustrates an embodiment of a six degree of freedom (6 DOF) remote hover touch controller device. 6 DOF devices track absolute position (X,Y,Z) and orientation (Pitch, Yaw, Roll). In one embodiment, a hover touch controller device 505 (FIG. 5B) is combined with a 6 DOF tracker 508 (FIG. 5A) to produce a hybrid device (FIG. 5C) that is more powerful than each of them individually. The hover touch controller device may be permanently attached to the 6 DOF tracker. Alternately, the hover touch controller device may be detachably attached to the 6 DOF tracker. While a 6 DOF tracker is provided as an example, more generally a hover touch controller may be combined with other tracking devices.

Figure 6A:
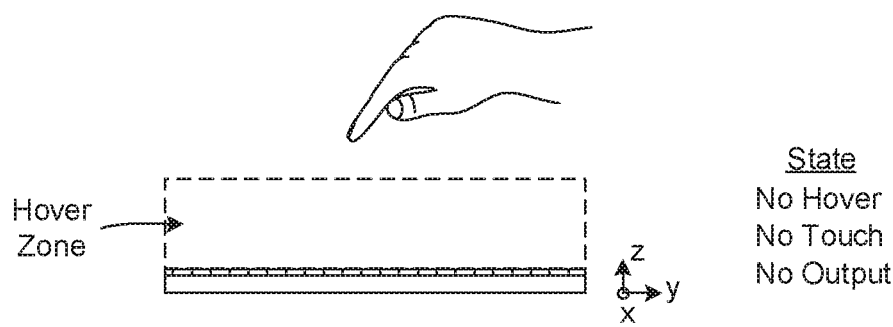
FIGS. 6A, 6B, and 6C illustrate states of operation for a hover touch controller in accordance with an embodiment.
Figure 6B:
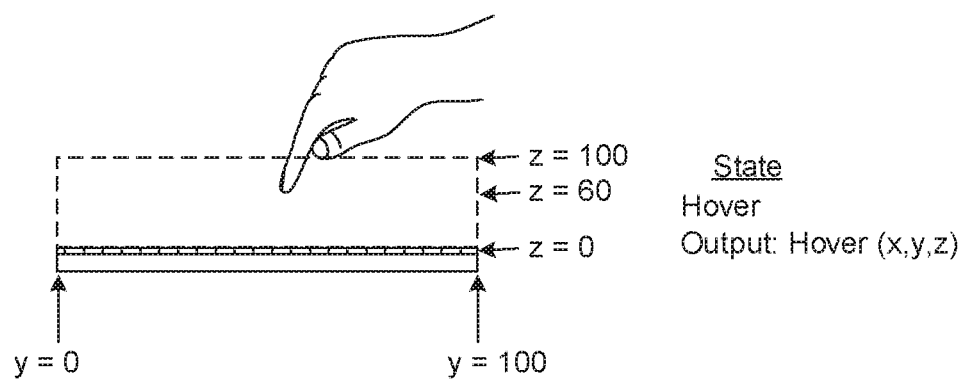
Figure 6C:
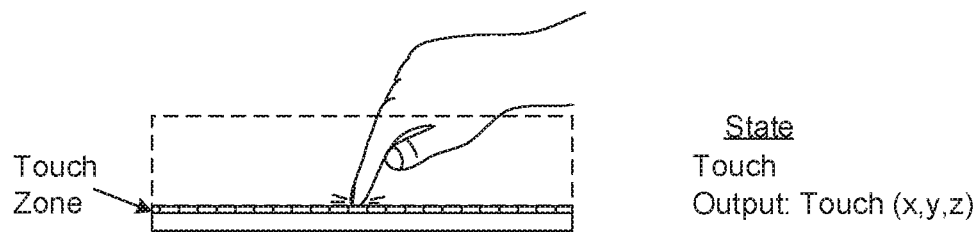

In one embodiment, a set of tracking and interaction states are defined for the tracking and touch data of a hover touch controller device. Referring to FIGS. 6A, 6B, and 6C, in one embodiment, an interaction space for the device can be categorized into two zones. A hover zone (illustrated by dashed lines) is a volume just above the surface of the hover touch controller device. FIG. 6A illustrates the user's finger outside of the hover zone, which corresponds to a state in which there is no hover (no Z data), no touch, and no output. FIG. 6B illustrates the user's finger in the hover zone. Full 3D tracking is available in the area of the hover zone and the fingertip can be tracked and expressed in 3D coordinates (X,Y,Z). The Z value, is the depth of the interaction point/finger and can be used to estimate how close it is to the surface. FIG. 6C illustrates the user's finger depressed to touch the surface (Z=0), which corresponds to a touch zone on a region on the surface of the controller device. Since Z is considered to be zero at the surface, only 2D tracking is provided here (X,Y). Alternatively, 3D tracking coordinates could be provided as (X,Y,0).

Figure 7A:
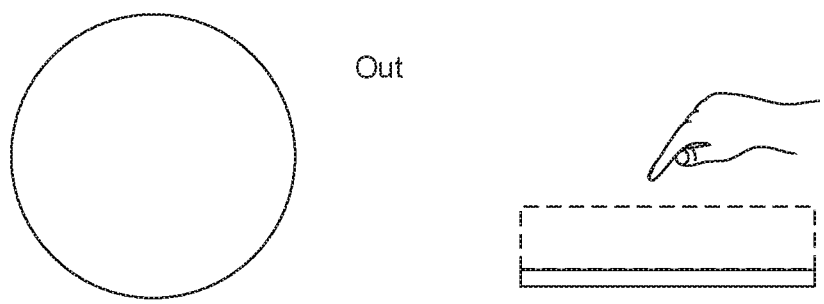
FIGS. 7A, 7B, and 7C illustrate interactions states of cursor mode in accordance with an embodiment.
Figure 7B:
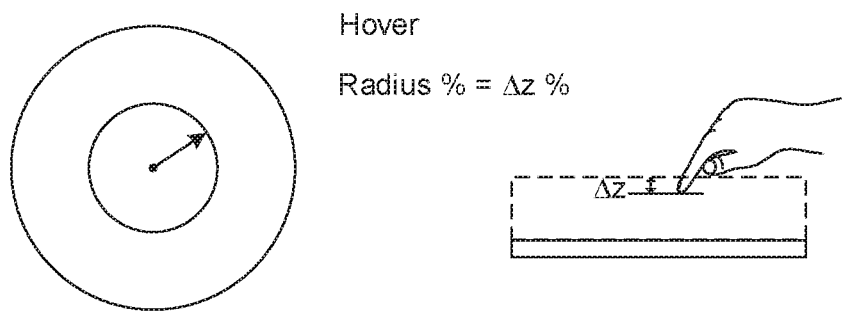
Figure 7C:
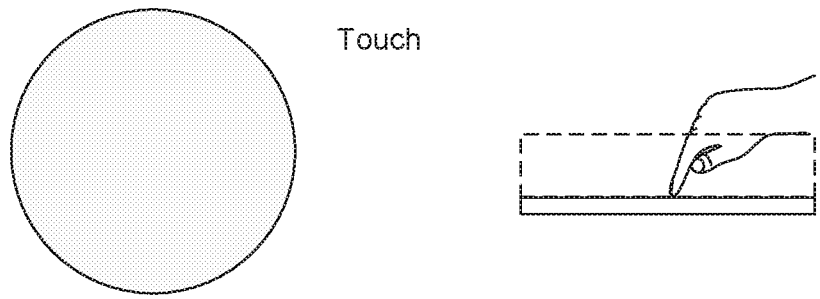

The user interfaces that are generated may be based on the interaction states. FIGS. 7A, 7B, and 7C correspond to an example in which there are 3 distinct interaction states based on which of the interaction zones that the finger is present in or not. The right side of each figure shows the finger position relative to the hover depth (dashed line) and touch surface. The left side of each finger illustrates aspects of a user interface. This leads to a set of states and user interfaces as follows:

OUT (FIG. 7A) Neither in the touch zone, nor in the hover zone. The finger is completely outside of the tracking space and hence no tracking happens. Thus, the user interface is at a default state that may, for example, be an open circle.

HOVER (FIG. 7B) When the finger is in the hover zone. In this example a hover zone user interface is generated. For the purposes of illustration, in one example this may be at a region having a radius that is based on the Z depth value such that it grows larger as the user's finger approaches the surface.

TOUCH (FIG. 7C) When the finger is touching the surface of the controller, i.e. in the touch zone. In this example, the region has expanded to its full dimension.

In one embodiment, FIGS. 7A, 7B, and 7C illustrate aspects of a cursor user interface in which the size of a cursor increases as the user's finger enters the hover zone and expands to a maximum size when the user's finger touches the touch surface. This aids a user to understand the state and navigate the user interface. FIG. 7B corresponds to a hover mode and FIG. 7C correspond to a touch mode of the cursor.

In one embodiment, the remote hover touch cursor mode is designed to provide visual representation of tracking information on the remote display, so users can understand their state and navigate correspondingly. This cursor, similar to a mouse cursor or that of a trackpad, shows (x,y) movement of the hand with respect to the controller device. For example, if the user's finger is at an (x,y) coordinate (0.2, 0.6) with respect to the surface of the touch sensor, the display of the hover touch cursor on the remote display would be situated at a corresponding position. This provides the user with the experience of watching the hover touch cursor move over the display in a way that tracks the movement of their finger without touching the surface of the touch sensor.

In addition, in one embodiment, a transformation of the user interface on the remote device is generated based on the Z value and the state. In one embodiment, the following states are supported:

OUT: When in the out zone, the cursor stops tracking and remains at the last valid tracked position. In one embodiment, the cursor user interface enters a visual display state that provides a visual feedback to the user of this. For example, the cursor user interface may turn white or clear, as illustrated in FIG. 7A. However, it will be understood that other visual indicators may be used instead of white or clear display.

HOVER: When in hover state, the visual display of the cursor changes. For example, an inner circular region may be colored or shaded and have a diameter that depends on the Z value (FIG. 7B). For example, the radius of the circle may correspond directly with the proximity of the finger to the surface (its Z value). Thus, when the finger is close to the touch surface, the circle is larger. When the finger is farther away, the circle gets smaller. This provides an intuitive feedback to the user. As the finger gets close to touch, the circle grows to almost fill the outer circle. On touch (FIG. 7C), the whole circle may also have a shift in shading, color, or other attributes (illustrated by shading in FIG. 7C), to aid in indicating to the user that a significant state change has happened.

Figure 8A:
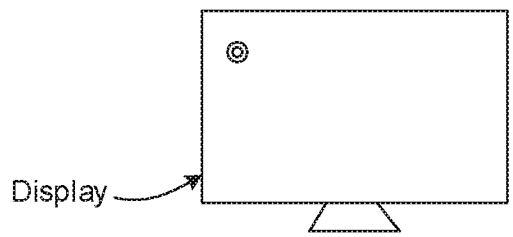
FIGS. 8A, 8B, 8C, and 8D illustrates finger positions over the touch sensor in hover mode and corresponding positions of a cursor on a display in accordance with an embodiment.
Figure 8A:
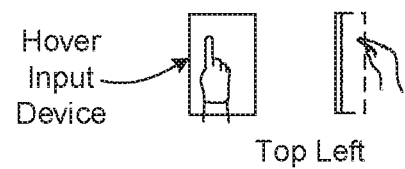
Figure 8B:
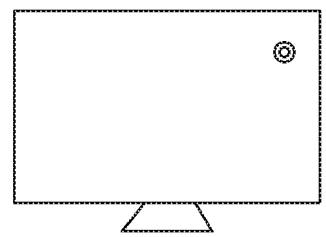
Figure 8B:
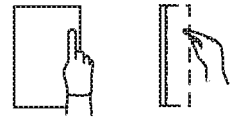
Figure 8C:
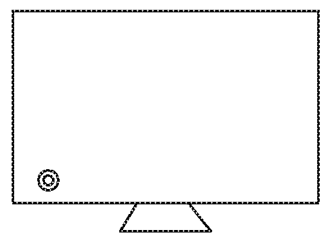
Figure 8C:
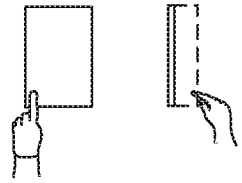
Figure 8D:
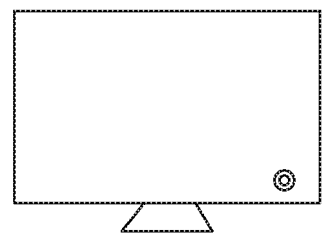
Figure 8D:
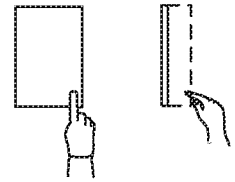

FIGS. 8A, 8B, 8C, and 8D illustrate the user's finger position (in the hover mode) and the corresponding user interface representation of the cursor of the display device. For example, FIG. 8A, illustrates the user's finger at the top left of the controller device (bottom left illustration) and the cursor displayed in a corresponding position on the display. The bottom right illustration shows that the user's finger is in the hover mode. FIG. 8B illustrates the user's finger at the top right of the touch surface for the controller, in hover mode, and the cursor display in the top right of the display. FIG. 8C illustrates the user's finger, in hover mode, at the bottom left of the touch sensor of the controller, and the cursor displayed in the bottom left of the display. FIG. 8D illustrates the user's finger, in hover mode, at the bottom right of the touch sensor of the controller, and the cursor displayed at the bottom right of the display.

As illustrated in FIGS. 7A, 7B, 7C, 8A, 8B, 8C, and 8D, the cursor movement and transformation on the display device provides comprehensive information about the interaction state of the finger with respect to the control surface. In other words, the hover modes may be used to generate a visualization that allows users to see what UI objects they are going to touch, before they touch it. This removes the user's need to look down at the controller device or their hands and work efficiently by just looking at the remote display.

The hover touch cursor may be used as part of a larger user interface scheme. For example, in one embodiment, the hover touch cursor and tracking are utilized to provide the equivalent of direct spatial input on remote display, where a direct spatial input means the user gets a visual feedback from the display of where their fingers are hovering and when and where they are about to touch. In essence, this is equivalent to a direct spatial input on a remote display. In particular, the visual feedback for the hover mode makes the interaction as easy as directly interacting with a mobile device with multi-touch.

Figure 9A:
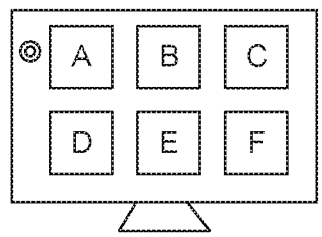
FIGS. 9A, 9B, 9C, and 9D illustrate finger positions with respect to the touch sensor, the cursor mode, and selection of buttons on a display in accordance with an embodiment.
Figure 9B:
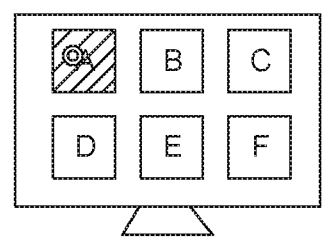

FIGS. 9A, 9B, 9C, and 9D illustrate an example of using hover touch to provide a user interface. In FIG. 9A, the user's finger position is at the far top left of the controller, resulting in the cursor being at the far top left of the display. FIG. 9B shows the user's finger position moved slightly to the right, resulting in the cursor overlapping button A. In one embodiment, as the user hovers over button A, the button (Button A) scales up. This is a very helpful feature because it lets the user know what button they are directly over. The user immediately knows which button would be activated if they were to touch down. The increased size of the button also means a higher probability that a touch down will land within the intended button, reducing typing errors. Moreover, artificial intelligence could be utilized so that the cursor snaps to the center of the closest user interface element instead of exactly following the finger coordinates. This could increase the speed of typing. In addition to, or an alternative to scaling, FIG. 9B also illustrates a change in the button not related to scale, such as a highlight including a color or shading (illustrated by diagonal hatched lines).

Figure 9C:
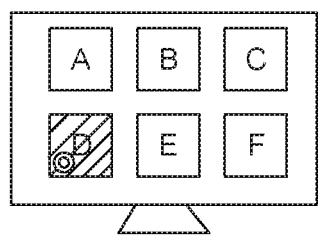
Figure 9D:
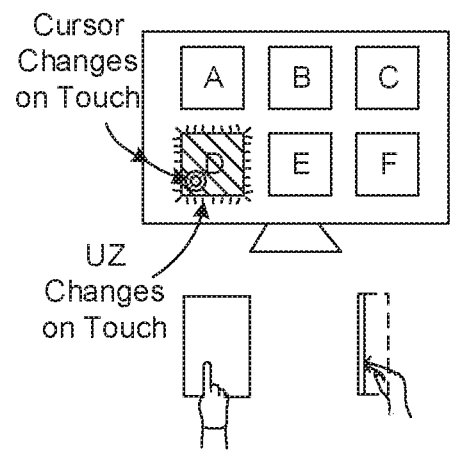

FIGS. 9C and 9D illustrate another example in which the user touches a user interface element. FIG. 9C illustrates the user hovering over button D. Thus, button D may change in scale and/or color or shading. FIG. 9D illustrates a touchdown in which the cursor changes to show touch. Additionally, when a touch down occurs, the visual effect of the button may be changed to indicate that the touch action has occurred (e.g., a change in color or shading). In one embodiment, when a touch down occurs, the visual effect of the button may be changed while the cursor becomes invisible.

Figure 10A:
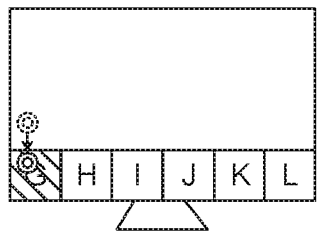
FIGS. 10A, 10B, 10C, and 10D illustrate finger positions with respect to the touch sensor and interactions with a scroll view in accordance with an embodiment.
Figure 10A:
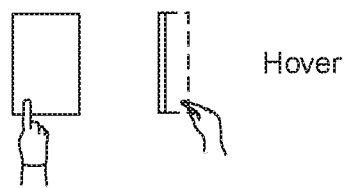
Figure 10B:
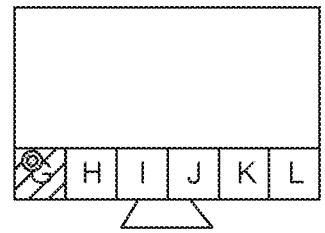
Figure 10B:
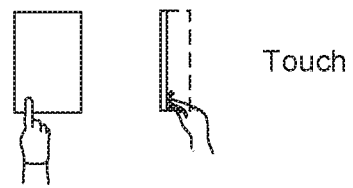
Figure 10C:
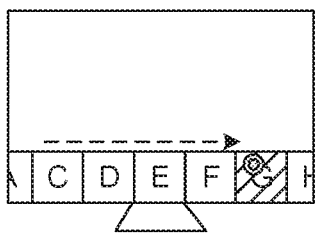
Figure 10C:
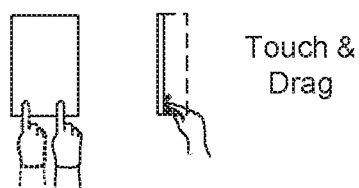
Figure 10D:
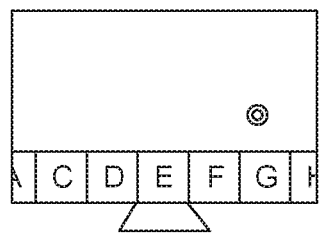
Figure 10D:
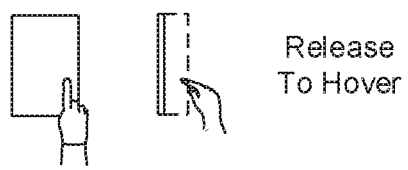

FIGS. 10A, 10B, 10C, and 10D illustrate another example of an interaction in accordance with an embodiment. A scrollview is implemented with remote hover touch. That is, a sequence of button elements is arranged in a sequence resembling a scroll that can be rolled/unrolled. In this example, the button elements have an ordered sequence (e.g., A, B, C, D, E . . . ) and the display shows a portion of the scroll. As the user starts to hover over the scrollview (FIG. 10A, illustrating scroll button elements G, H, I, J, K, L) the element hovered over (button G) changes color to indicate which one would be grabbed if a touch happens. On touch down (FIG. 10B), the element changes color indicating contact. Now the user can drag the touch point to the right (FIG. 10C) to scroll the view to reveal more elements on the left. On release (FIG. 10D), the interacted element resets its colors. In one embodiment, selection is a touch and release on an element without a drag.

Figure 11:
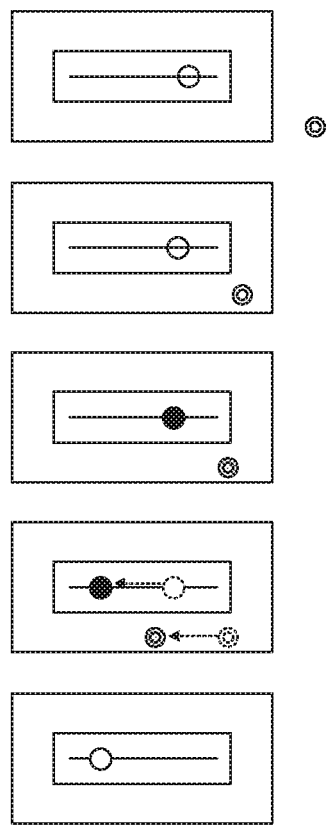
FIG. 11 is a series of panels illustrating a slider being influenced in a hover mode prior to being directly interacted with in a touch mode in accordance with an embodiment.

In one embodiment, hover mode information is used to predict a user's intention to interact with UI element (e.g., a UI widget) and generate relative movement information to interact with the UI widget. FIG. 11 illustrates an example of slider in which the user does not have to precisely touch the ball of a slider in order to move the slider. When the cursor enters the boundary of a UI element, it is then assumed that all interactions that follow will be to control the respective UI element. In the top panel, the cursor is hovering outside the boundary of the UI element. In the second panel from the top, the cursor has moved into the UI element boundary in hover mode. From this point on, as long as the cursor stays within the UI elements boundaries, all hover and touch interactions anywhere in the boundary are redirected to the slider. In the middle panel, in touch mode the cursor and the slider both change in appearance. The second to the bottom panel illustrates translating the cursor (in touch mode) and the corresponding slider movement. The bottom panel illustrates a transition to an out state, where the cursor has left the UI element's boundary. Thus, interactions with the cursor are no longer redirected to the UI element.

Using hover mode information to generate relative movement provides several advantages. For example, suppose a UI widget has only a predetermined, limited scope of interactions. When the user touches down at an arbitrary point on the widget, the relative movements from the touch down point may be mapped on to the UI element within the widget's area. Since the user does not have to precisely touch the ball of the slider anymore, their interactions can now be more casual, less error prone, and allow for faster interaction.

Figure 12:
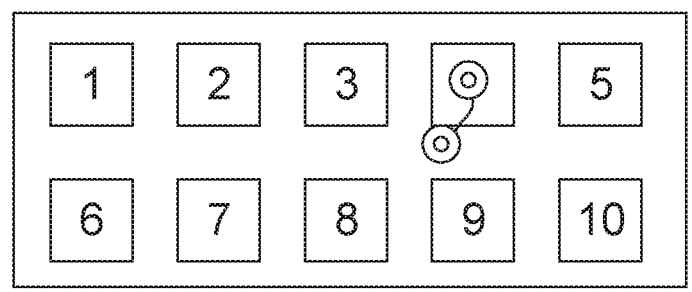
FIG. 12 illustrates a hover mode snap-to-nearest mode cursor (top panel) providing an indication of snap-to-nearest mode for a touch mode in accordance with an embodiment.
Figure 12:
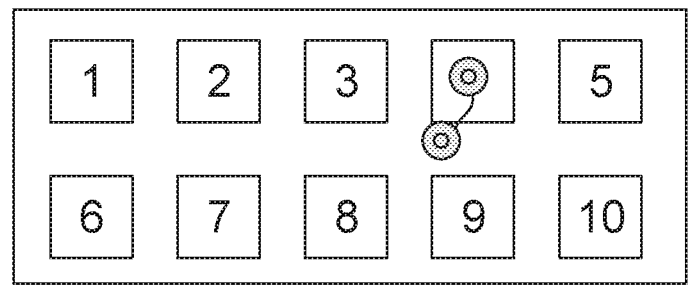

FIG. 12 illustrates an embodiment that supports a snap-to-nearest mode of operation. The hover mode information may be used to calculate the closest interactable user interface feature (e.g., a widget or button) and based on that calculation generate a visualization of a secondary cursor to snap a copy of the cursor to the center of that feature. As the user hovers over a keyboard (top panel), a secondary cursor snaps to the closest button. As the user continues to move their finger, the snapped secondary cursor keeps jumping to the correspondingly closest widget. When the user touches down (bottom panel), the secondary cursor also touches down to activate the widget that it is snapped to. That is, the hover mode snap-to mode indicates to the user which widget will be snapped to in the touch down mode. The snap-to-nearest interface allows for reduced error in typing/input, faster typing/input, and fitting more widgets in the same layout.

Figure 13A:
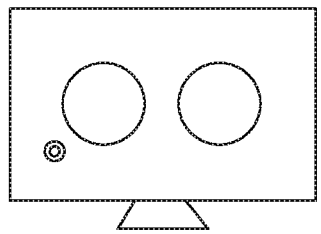
FIGS. 13A, 13B, 13C, and 13D illustrate aspects of revealing hidden UI elements in a hover mode in accordance with an embodiment.
Figure 13A:
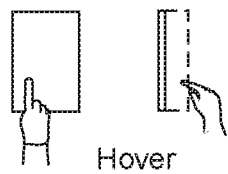
Figure 13B:
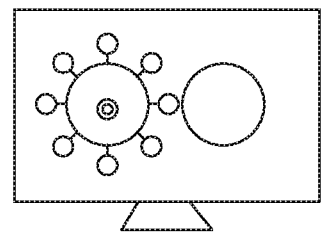
Figure 13B:
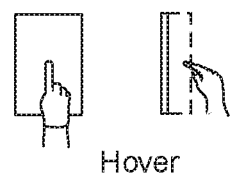
Figure 13C:
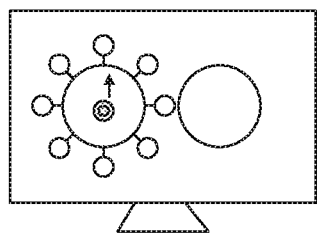
Figure 13C:
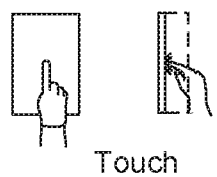
Figure 13D:
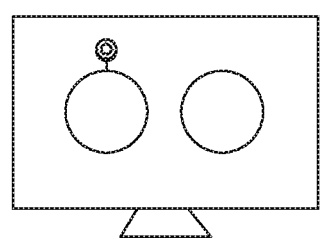
Figure 13D:
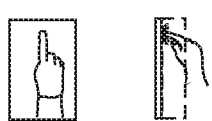

In one embodiment, remote hover touch allows for reducing clutter by hiding UI elements and revealing them on hover. That is, the hover mode can be used to reveal additional UI elements. FIGS. 13A, 13B, 13C, and 13D show an example interaction in accordance with an embodiment. FIG. 13A illustrates the user hovering outside of the left circle. When the user hovers over the left circle (FIG. 13B), the user interface changes for the circle to reveals all its children. When the user touches down on the parent circle and slides to a child element of interest (FIG. 13C), other sibling menus disappear. (FIG. 13D). On release, the child menu is then selected. This hierarchical selection is achieved with one touch+slide action. A similar end result, in terms of hierarchical selection, would otherwise take several additional steps in a traditional interface. The same technique may be extended to multi-hierarchical selection of menus (parent-child-grandchild-great grandchild etc.)

In one embodiment, the hover mode is used to implement a push to zoom interface. FIGS. 14A, 14B, and 14C illustrate an example of a push to zoom interface in accordance with an embodiment. The user hovers over element B2 (FIG. 14A), which then highlights (or otherwise changes a display attribute) to show hover. As illustrated in FIG. 14B, the user then starts to push in on the depth, getting closer to the surface. As the finger gets closer to the surface, the page starts to zoom about the center of the cursor. (The relative position of the center of the circle in screen coordinates remains same). Also, as illustrated in FIG. 14B, the cursor may also change to indicate that the user's finger is moving closer to the surface. When the user has pushed through 100% of the depth (FIG. 14C), the page has zoomed in to become much larger (e.g., several times) than its original size, scaling about the center of the cursor. The cursor in this example is also now displayed in the touch mode. The user can now touch the UI element easily. In one embodiment, the depth of the finger becomes the zoom percentage about the center point of the cursor. If the user starts to move left and right say at 50% zoom, the operation becomes similar to panning a zoomed image left and right.

Figure 15A:
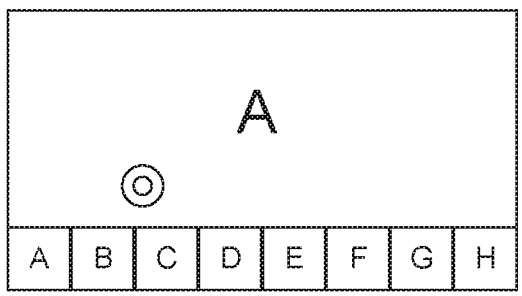
FIGS. 15A, 15B, 15C, and 15D illustrate use of a hover mode to implement a preview feature in accordance with an embodiment.
Figure 15A:
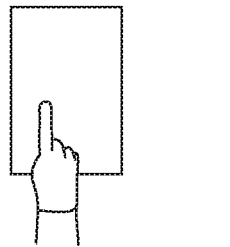
Figure 15A:
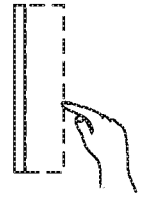
Figure 15B:
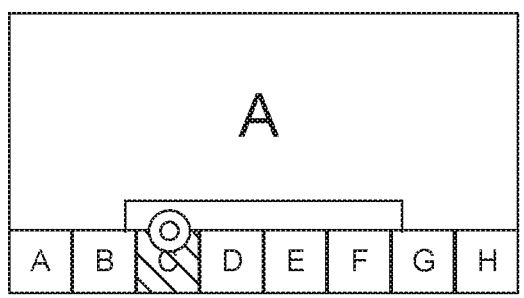
Figure 15B:
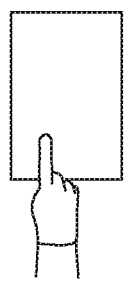
Figure 15B:
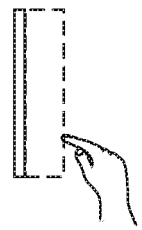
Figure 15C:
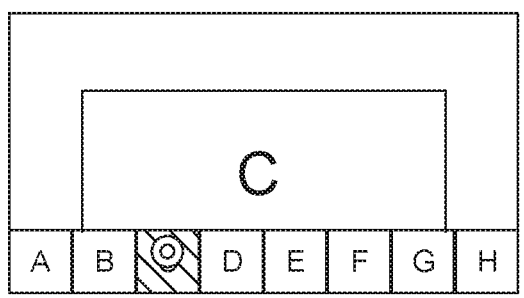
Figure 15C:
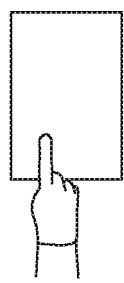
Figure 15C:
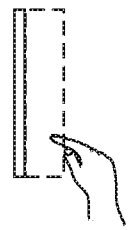
Figure 15D:
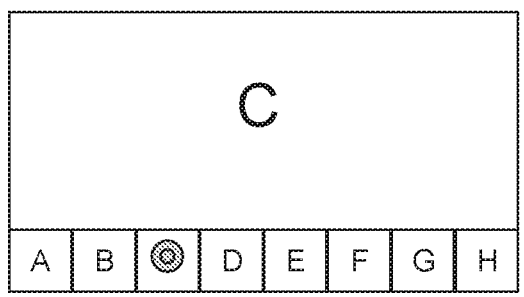
Figure 15D:
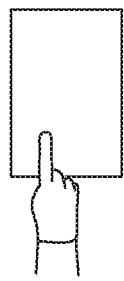
Figure 15D:
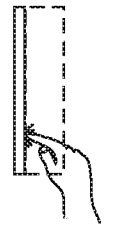

In one embodiment, the hover mode is used to implement a preview mode. FIGS. 15A, 15B, 15C, and 15D illustrate a preview mode in accordance with an embodiment. In FIG. 15A, the user initially hovers above a set of menu items. As the user hovers over menu item C (FIG. 15B) and starts to push closer along the depth (FIG. 15C), the video/window corresponding to item C starts to peak out. At the time when the finger touches item C (FIG. 15D), the video/window has grown to full screen to replace the previous window. Alternatively, if the user backtracks or moves away before touching C, the scaling video/window as well disappears. This allows for users to preview the channel before having to commit to switching to it.

In one embodiment, the hover mode is use to reveal child menus. FIG. 16A illustrates what might be called "distributed touch", in that as the finger of the user hovers over parent menu item C (second panel from the top), the corresponding child menu (C1, C2, C3, C4) is revealed. Similarly, as the finger hovers over item D (third panel from the top), the child menu for D is displayed (items D1, D2, D3, D4). When the finger touches down on parent menu D, a second cursor is initiated in the child menu with items D1-D4. FIG. 16B illustrates the second cursor for the D child menu. With the finger touched down, when the user moves the finger, the primary cursor remains frozen, while the secondary cursor (items D1, D2, D3, D4) starts to reflect the movement. When the finger slides to D4 and releases, content corresponding to D4 is selected (bottom panel).

In one embodiment, the ratio of screen position of parent menu item is used to initially position the secondary cursor. In the example of FIGS. 16A and 16B, the item D was roughly 40% from the left end of the parent menu. Therefore, the secondary cursor is also initiated at roughly 40% from the start of child menu. Maintaining the ratio allows enough room for slide and selection to happen. However, more generally other ratios could be used.

As an example of using hover mode to reveal child menus, suppose that the secondary cursor was always placed in the center of the child menu. In this situation, if the primary menu item selected was left most in the screen, then the user would have menu items to the left in the child menu, but no room to slide to the left, since they will go out of the touch region. Thus, applying the ratio of screen position is a design consideration to achieving a satisfactory user experience.

In one embodiment, using hover mode to reveal child menus achieves selection in only 3 steps:
1) Touch down on menu item in parent menu;
2) Slide secondary cursor on to desired item in child menu; and
3) Release to select.

In contrast, in conventional parent menu & child menu situation (e.g., using a conventional touch screen display), the user selects an option from the parent menu, which reveals a child menu. Then the user would need to move their finger to the child menu and then select an item there. This is essentially 5 steps:
1) Touch down on menu item in parent menu;
2) Release touch;
3) Finger travels to child menu;
4) Touch down on child menu; and
5) Release touch.

It will be understood that the principle of "distributed touch" can be extended further to a two-dimensional set of menus. The two-dimensional set of menus may, for example, be arranged around the perimeter of a display or otherwise arranged in a two-dimensional pattern over the display.

As previously described, in one embodiment, a hybrid device combines 6 DOF and a hover touch controller. A hybrid 6 DOF hover touch controller provides new interaction opportunities in terms of viewing, identifying and touching user interface elements. In particular, a hybrid 6 DOF and hover touch controller permits interactions that a user could not operate in a conventional 6 DOF controller, such as interacting with user interface elements that would ordinarily be difficult to interact with when the size of the elements is smaller than the finger radius (fat finger problem). For example, the 6 DOF controller could be used to provide absolute orientation information that is combined with the Z-depth information of the hover touch portion. Alternatively, relative orientation information from the 6 DOF controller could be combined with Z-depth information of the hover touch portion.

Figure 17A:
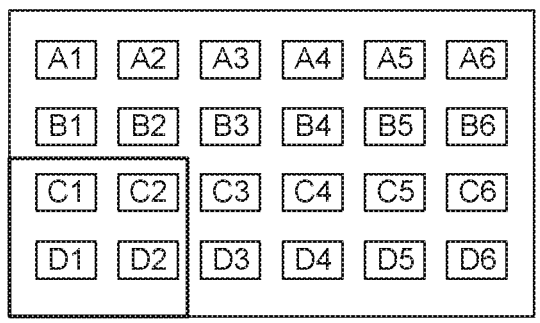
FIGS. 17A, 17B, and 17C illustrate menu selection using a hybrid device including six degree of freedom tracking and hover touch in accordance with an embodiment.
Figure 17A:
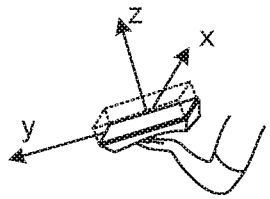
Figure 17B:
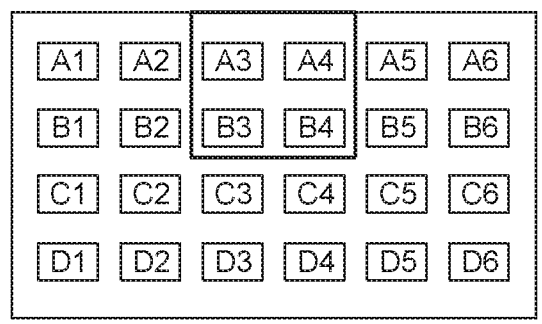
Figure 17B:
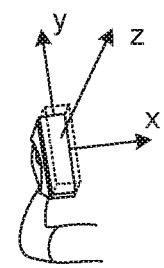
Figure 17C:
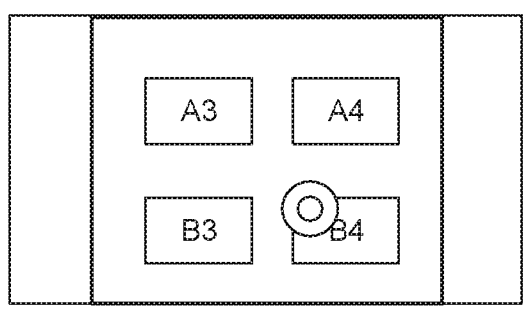
Figure 17C:
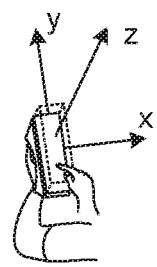

FIGS. 17A, 17B, and 17C illustrate an example use case of a hybrid device combining 6 DOF and a hover touch controller. The user is holding the 6 DOF remote hover touch device in their hand. As the user rotates their hand, the orientation of the hybrid device changes. In FIG. 17A, the user starts with the device dipped to the left-bottom. Correspondingly, the zone on the left-bottom is highlighted. As the user rotates the device towards the middle, the middle-top zone is highlighted, as illustrated in FIG. 17B. Now with the hybrid device still rotated towards the middle, the user brings in the interacting finger into the hover zone, as illustrated in FIG. 17C. In this example, when the finger enters the hover zone, the highlighted area in the screen zooms to twice its size to fill the screen. This example illustrates how coarse selection of a region of interest may be performed by the 6 DOF and fine grained selection performed via the hover touch interface. In one embodiment, the aspect ratio of the selection zone can be designed to match that of the remote providing a 1:1 mapping between the X-Y interactions on hover touch to X-Y interactions in the zoomed interface on the display.

In one embodiment, an application of a hybrid device combining 6 DOF and a hover touch controller is in Head-Mounted-Displays, where users transition between 3D interaction and 2D screen-space interaction. Example applications include use in Virtual Reality (VR), Augmented Reality (AR) and Mixed reality (MR) environments. The term Virtual World (VW) may be used describe the area collectively covered by VR, AR and MR.

One of the problems with wearing a VR head mounted display is that the user loses sight of the real world. This means they cannot directly read numbers on physical input device controllers. As a consequence, this renders it impossible for the user to directly enter inputs using conventional physical remotes or mobile phones with touch screens while wearing a VR head mounted display. The conventional workarounds to this problem are unsatisfactory. One approach is to create virtual hands to enter inputs. Some VR HMDs have embedded depth cameras in them to track the hands in front of them, which are usually represented in the virtual worlds as virtual hands and allow free hand input. When it comes to AR and MR, users can view through the HMD to see their hands, which can be tracked with a camera on the HMD and allowing for free hand gestural input. Even though free hand input allows for some gestural interactions, it is not sufficient for complex input such as alphanumeric and text data. Further, the requirement to hold up the hand all the time (to be within the user's FOV) is cumbersome and uncomfortable. AR and MR HMDs, due to their see through nature, allow for looking down at multi touch screens and hence the use of multi-touch devices. But, this suffers from the issue that the user's attention is divided having to shift their gaze back and forth between their augmented/mixed world and the multi-touch screen, resulting in a poor experience as well as fatigue from refocusing.

In one embodiment, a hybrid 6 DOF with remote hover touch variant may be used to improve interactions in the VW. Interactions in the VW can be categorized into 4 areas:
  a) Screen relative: Working just within the screen space coordinates of the display. This is essentially 2D interaction to pick 3D objects;
  b) World relative: Working in world coordinates. For example, reaching out to grab a floating 3D object;
  c) Object relative: Working in object coordinates. For example, a UI panel attached to a 3D object; and
  d) Hand relative: Working within hand coordinates. For example, radial menus, that are attached to and travel with the hand.

In one embodiment, a hover touch controller and its 6 DOF variant can address all 4 of the aforementioned interaction categories (or subsets thereof). For screen relative interactions, the screen space interactions map remote hover touch interactions to the screen coordinates of the VW viewport.

Figure 18:
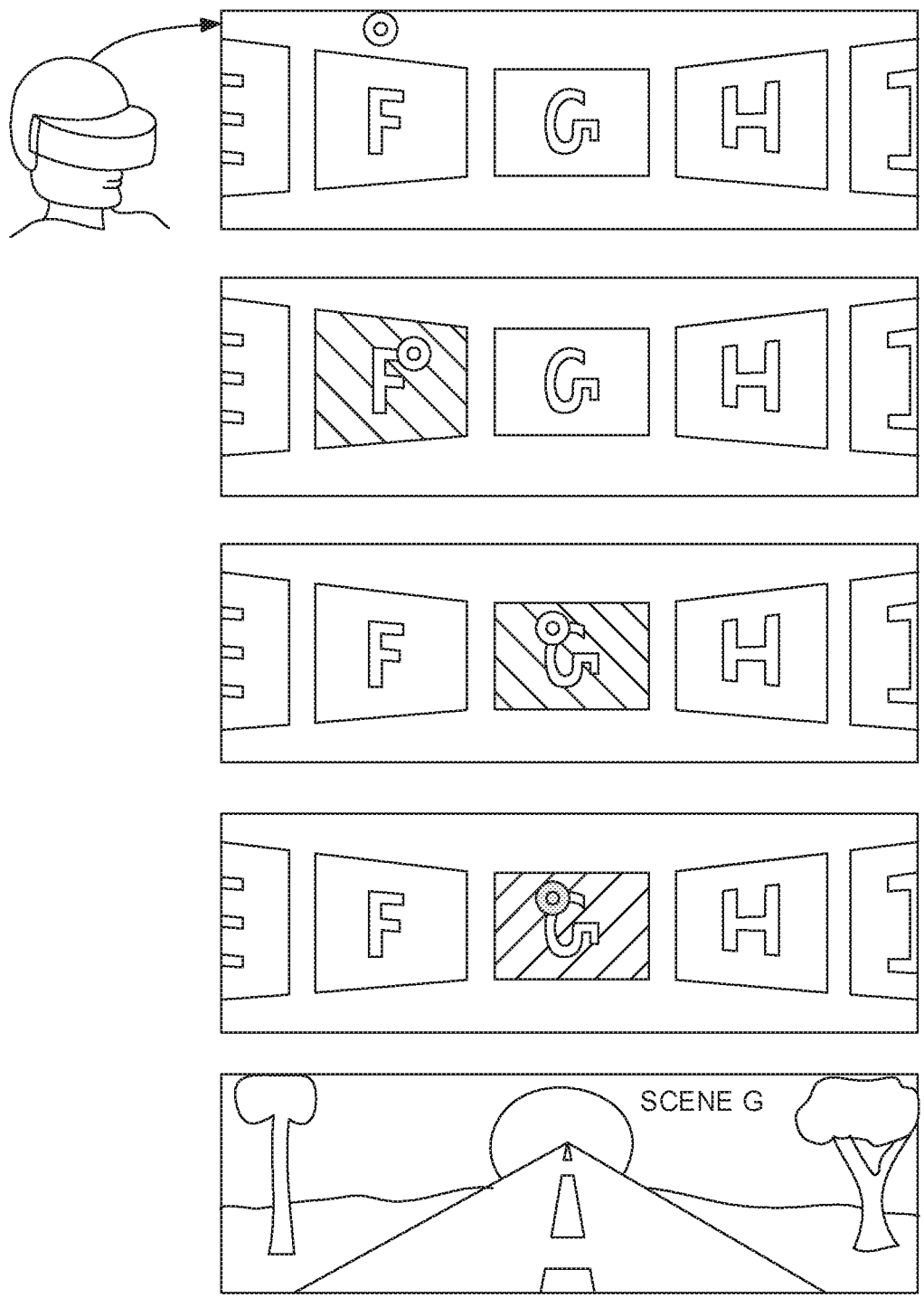
FIG. 18 illustrates an example in which a hover mode is used for ray picking in accordance with an embodiment.

FIG. 18 illustrates an example of an embodiment in which 3D objects are interacted with by the process of ray picking. The remote hover touch input maps to 2D screen coordinates (X,Y). A 3D ray is then cast from this point into the scene, in a direction normal to the surface of the screen. The first object the ray intersects is then used for selection. As shown in FIG. 18 (top panel), the remote hover touch cursor hovers over 3D menu elements that float in air and the objects underneath get highlighted (second panel from top). When the finger touches the surface of the input device, the cursor transitions to the touch mode. The 3D object being selected (item G in the second panel from the bottom) also change at least one attributes (e.g. color) to highlight selection. On release, the necessary action linked to item G is invoked (scene G in the bottom panel). A similar technique (not shown) can be used to move 3D objects in the Virtual Environment. For example, in hover, the cursor can be placed on an object and then in touch mode movement of the cursor moves the object.

Figure 19:
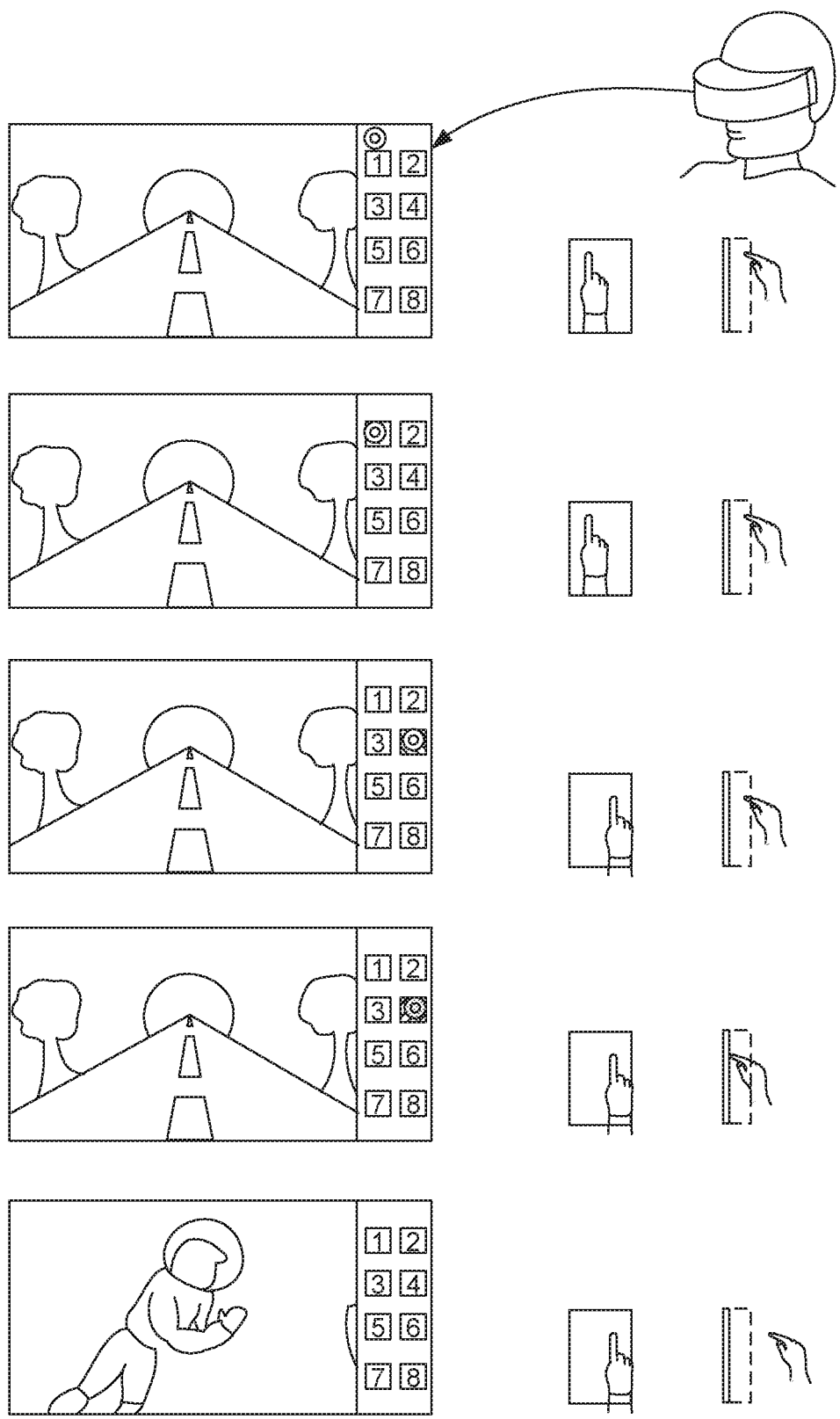
FIG. 19 illustrates an example in which hover touch is used in a heads up display in accordance with an embodiment.

In one embodiment, the remote hover touch can be used to interact with Head Up Displays (HUDs), with menu items stuck to screen space. FIG. 19 shows an example scenario where a collection of buttons (e.g., 1, 2, 3, 4, 5, 6, 7, 8) are fixed to the right of the screen. In one embodiment, remote hover touch is used to hover over to the desired button (top three panels) in the hover mode and then touch down (second panel from the bottom) to select a desired button, which in turn may perform an action when released (e.g., change the scene in the bottom panel).

Figure 20:
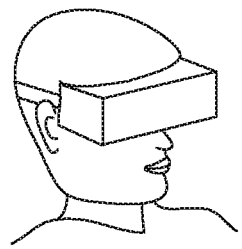
FIG. 20 illustrates an embodiment in which a hover touch controller is collocated with the display of a head mounted display in accordance with an embodiment.
Figure 20:
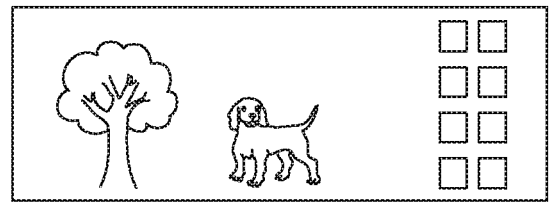
Figure 20:
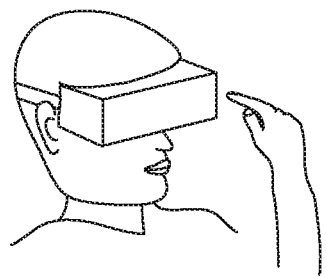
Figure 20:
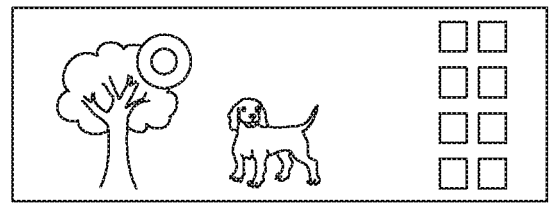
Figure 20:
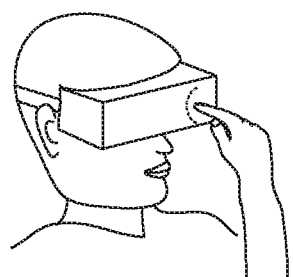
Figure 20:
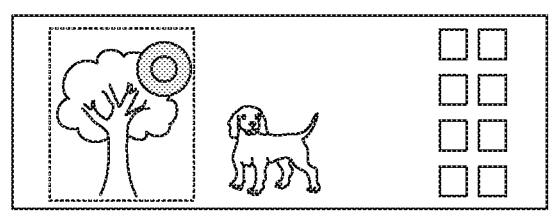

FIG. 20 illustrates an embodiment in which the hover touch controller is integrated into the head mounted display, collocated with the display and matching its dimensions. The top panel (right side) illustrates the display with a scene, such as a tree and a dog. In this setup, the middle panel illustrates that the user hovers their finger in front of their face (similar to a stance they would take when about to touch their own eyes). The hover touch cursor appears at the same location in the display where the finger point to. As the finger moves closer or further away along the normal axis of the display, the cursors correspondingly updates its depth representation as mentioned in previous embodiments. When the user touches the front surface of the HMD (bottom panel), the screen space selection similar to previous embodiments happen. One aspect of the collocation of input and display space is that when input is collocated with a display, it significantly reduces the cognitive load for the following reasons:
  a) The visual feedback is at the exact same physical location that input/touch happens, so no mental translations need to happen as in the of case non-collocated inputs such as the mouse;
  b) The input system is the exact same dimensions as the display which means reduced overloads in terms of reach/traversals; and
  c) The aspect ratio for the display is the same as the aspect ratio of the input surface and not scaled differently along different axis (imagine using a square absolute touch surface for a rectangular display).

Additionally, collocation of input and display space takes advantage of the user's sense of proprioception. Human beings possess the sense to spatially locate different parts of their body even with the eyes closed. This aspect of body space spatial intuition allows the users to perform this interaction at a much faster rate. Secondly, since the user is not holding anything in their hands, this embodiment adds the benefit of leaving their hands free in between interactions, allowing the hands to rest or to grasp and interact with other real world objects. Finally, this embodiment provides the minor benefit of not losing the input device and trying to locate it again (which can be pretty hard in a VR scenario, where the user is blind with respect to the real world).

The head mounted display with remote hover touch may be implemented in a VR system. However, more generally, the remote hover device may be clear or transparent for use AR/MR HMDs that require seeing past the display on to the real world.

Figure 21:
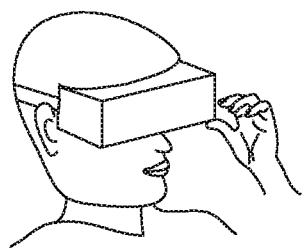
FIG. 21 illustrates an example of a hover touch controller that is detachable/attachable to a head mounted display in accordance with an embodiment.
Figure 21:
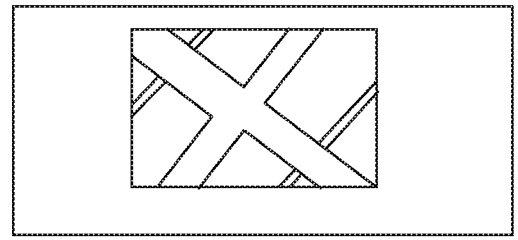
Figure 21:
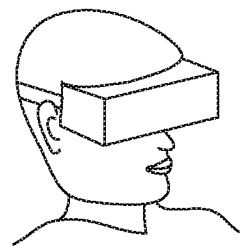
Figure 21:
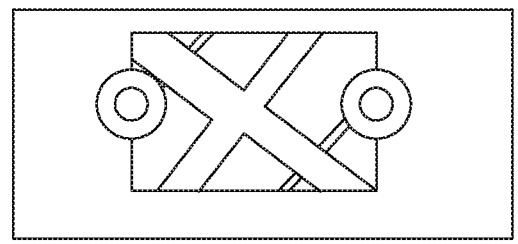
Figure 21:
Figure 21:
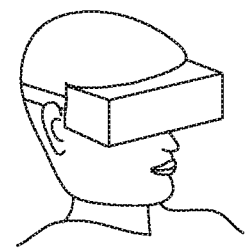
Figure 21:
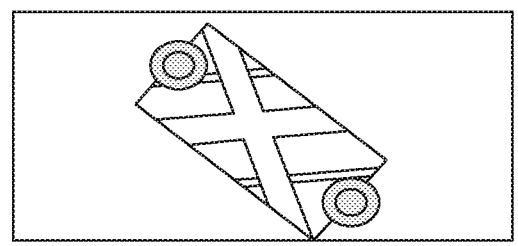
Figure 21:

FIG. 21 illustrates an embodiment in which a hover touch controller is made detachable/attachable to a HMD, giving the user the option to choose to use it either as a collocated input device or to remove and hold it in their hands comfortably and interact with it. The top panel illustrates the remote hover touch input device attached. Since the remote hover touch device size still matches the dimensions of the display 1:1, most of the cognitive benefits related to scale and aspect ratio are maintained, although the benefit of collocation will be lost, which will be substituted a little by proprioception (relative position within the input device space). This adaptation is an alternative to the previous embodiment in see-through HMDs for AR/MR where in certain scenarios it is less desirable to occlude one's own Field Of View with one's own finger. The bottom two panels show the hover touch controller detached from the HMD.

Figure 22A:
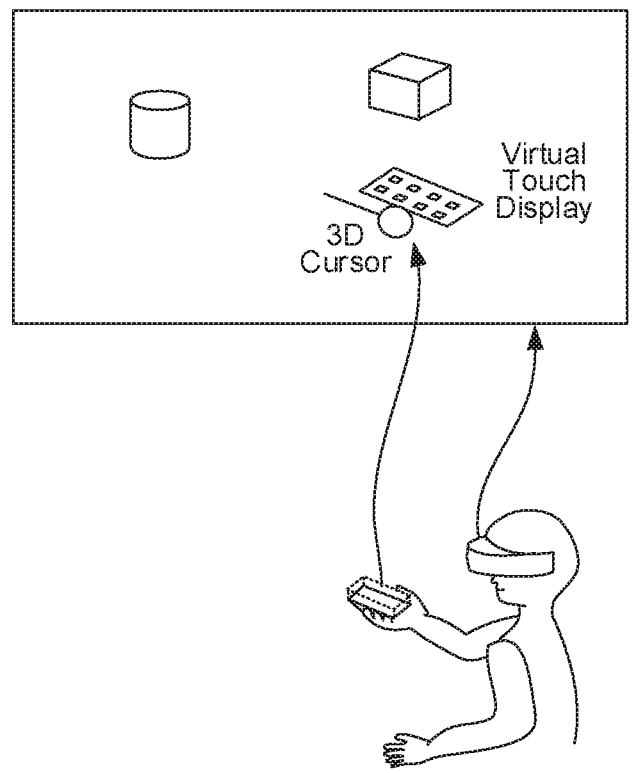
FIGS. 22A and 22B illustrate hand-space interactions in a virtual world for a hybrid device having a six degree of freedom tracker and hover touch in accordance with an embodiment.
Figure 22B:
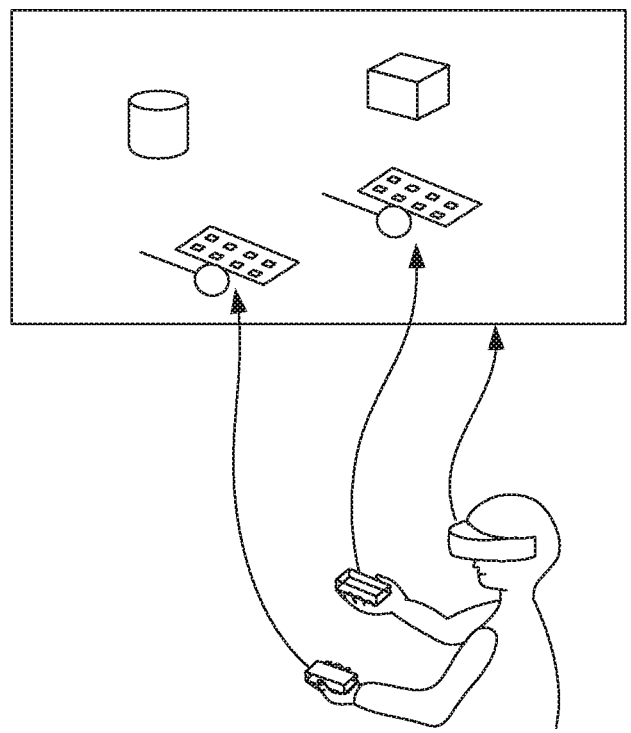

FIGS. 22A and 22B illustrate an embodiment of hand space interactions in the VW for combination of 6 DOF tracking with hover touch. In one embodiment, when a 6 DOF input device is tracked, it can be represented in the 3D environment via a 3D cursor, such as a sphere with a wand (stick), showing the position and orientation of the hand. The direction of the stick is the direction in which the user is holding the input device in the VW. In one embodiment, this information is used to place the equivalent of a virtual mobile touch display within the 3D environment. This is illustrated in FIG. 22A. The hover touch interactions are mapped to a GUI on this virtual mobile touch display. This virtual mobile touch display can be positioned and oriented to align with the 6 DOF tracking. This, in essence provides the equivalent of a virtual mobile device/touch panel that can be moved around and rotated in the virtual environment, similar to how a user moves around a mobile phone in the real world. The same can be extended to both the hands, as shown in FIG. 22B.

The virtual mobile touch display is, broadly speaking, a GUI in the VW. However, it may have virtual representations of one or more UIs of real mobile devices, such as a virtual keyboard, virtual buttons, etc. That is, a complete virtual representation of all of the features of a real mobile device is not required.

Figure 23A:
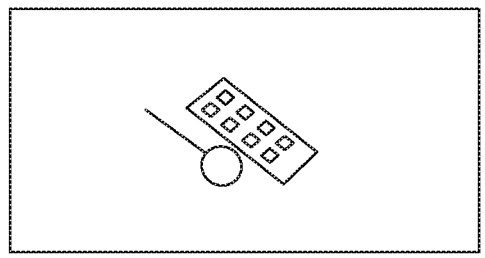
FIGS. 23A and 23B illustrate aspect of generating a virtual mobile touch display and associated interactions for a hybrid device having a 6 degree of freedom tracker and hover touch in accordance with an embodiment.
Figure 23A:
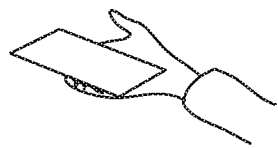
Figure 23A:
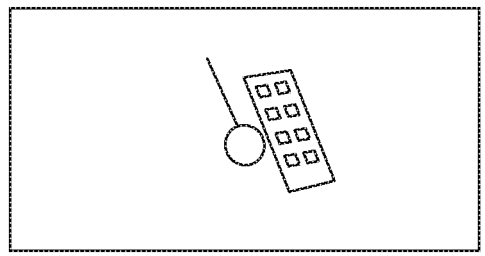
Figure 23A:
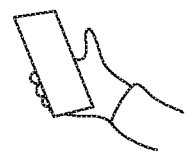
Figure 23A:
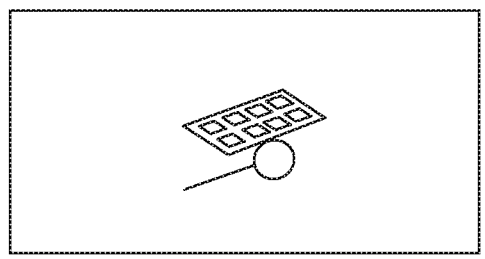
Figure 23A:
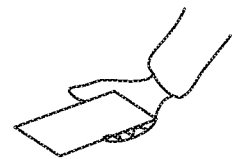
Figure 23A:
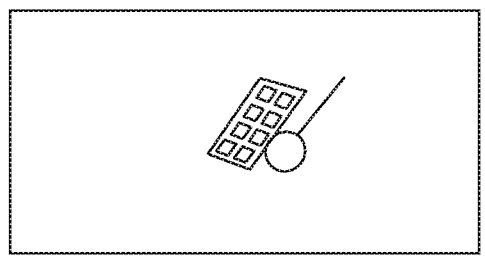
Figure 23A:
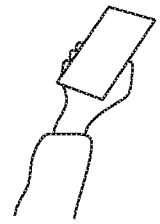
Figure 23B:
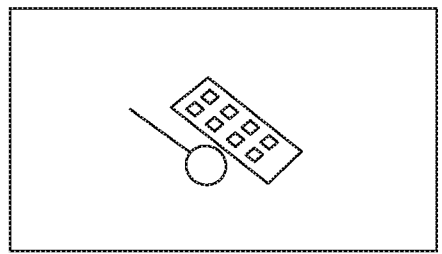
Figure 23B:
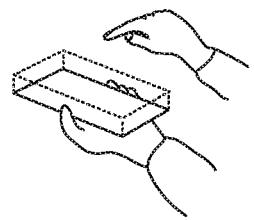
Figure 23B:
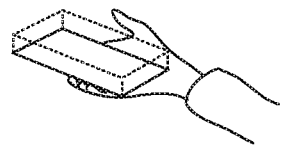
Figure 23B:
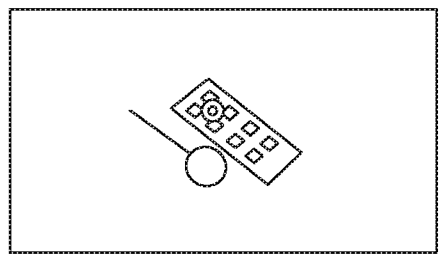
Figure 23B:
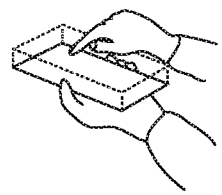
Figure 23B:
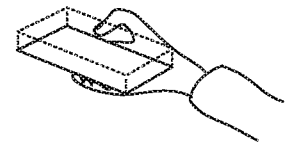
Figure 23B:
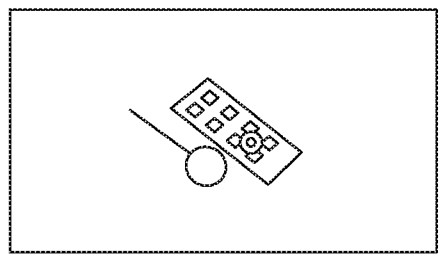
Figure 23B:
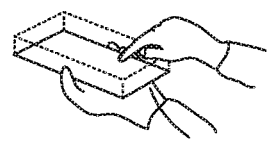
Figure 23B:
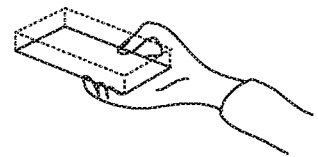
Figure 23B:
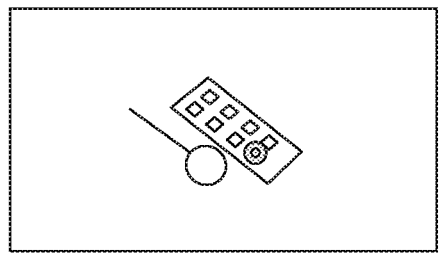
Figure 23B:
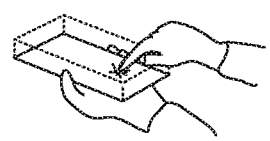
Figure 23B:
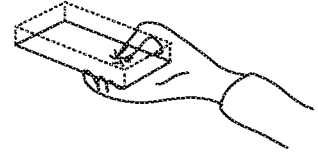

FIG. 23A shows the virtual mobile touch display (left) and the corresponding movement and rotation of the user's hand for the hybrid 6 DOF remote hover touch. The cursor (e.g., a sphere and a wand indicating a direction based on the movement and rotation of the user's hand) is illustrated for a set of different hand movements/rotations. The virtual mobile touch display is displayed. FIG. 23B illustrates that when user's finger enters the hover touch zone (second and third panel from the top), the equivalent of a hover touch cursor appears on this virtual mobile touch display. As shown in FIG. 23B, the user can move their finger to the desired menu item and touches down to select (bottom panel), just like in a mobile device in the real world. This permits familiar interactions on mobile devices such as dials, swipes, physics, and taps to be brought into a VW environment.

Figure 24:
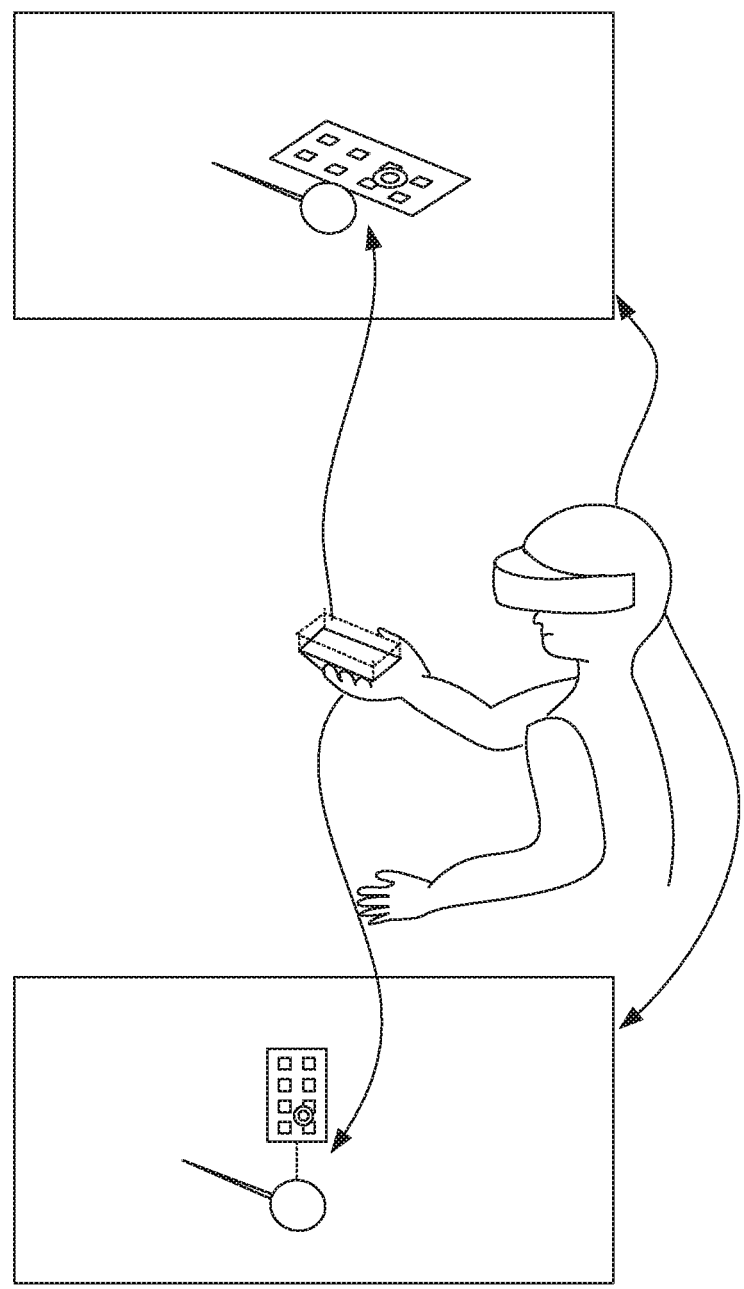
FIG. 24 illustrates an example of bill boarding for a hybrid device in accordance with an embodiment.

In some situations, a user may want their attention to be focused on a particular area in front and not have to look down at the virtual mobile touch display device. Also, the 6 DOF tracker could be at odd angles, making the viewing of the virtual mobile touch device attached to it difficult. Because the virtual mobile device is a purely graphical simulation, it can be set up to be always facing the user—A behavior commonly referred to as billboarding in computer graphics. The height of these billboards can also be set up to be the same as the user's eye level. An example of the same can be seen illustrated in FIG. 24. In a variation of this embodiment, the user can temporarily detach the 3D cursor (bottom panel) from this virtual mobile device to keep it at a constant position and orientation relative to the user's view.

Figure 25:
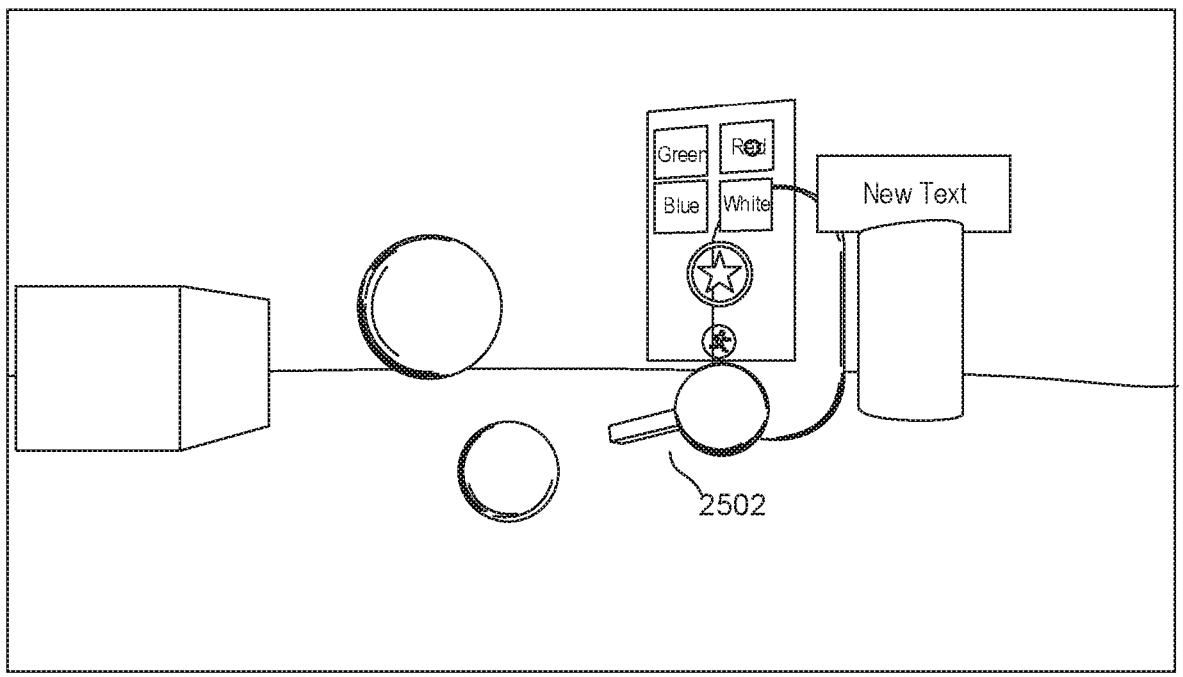
FIG. 25 illustrates a user interface in which the user interface represents six degree of freedom hand tracking and includes a floating virtual mobile device in accordance with an embodiment.

FIG. 25 shows an example implementation in accordance with an embodiment. 6 DOF hand tracking is represented by the floating 3D cursor 2502 (illustrated by a ball and wand). Above the cursor is a floating virtual mobile touch display device that is displaying a graphical user interface (e.g., red, green, blue, white elements). The circle (on the element labeled "Red") is the hover touch cursor, which moves as the user moves their fingers about the hover touch surface. The user is able to hover and target a particular graphical user interface element and then touch down to select it.

Figure 26:
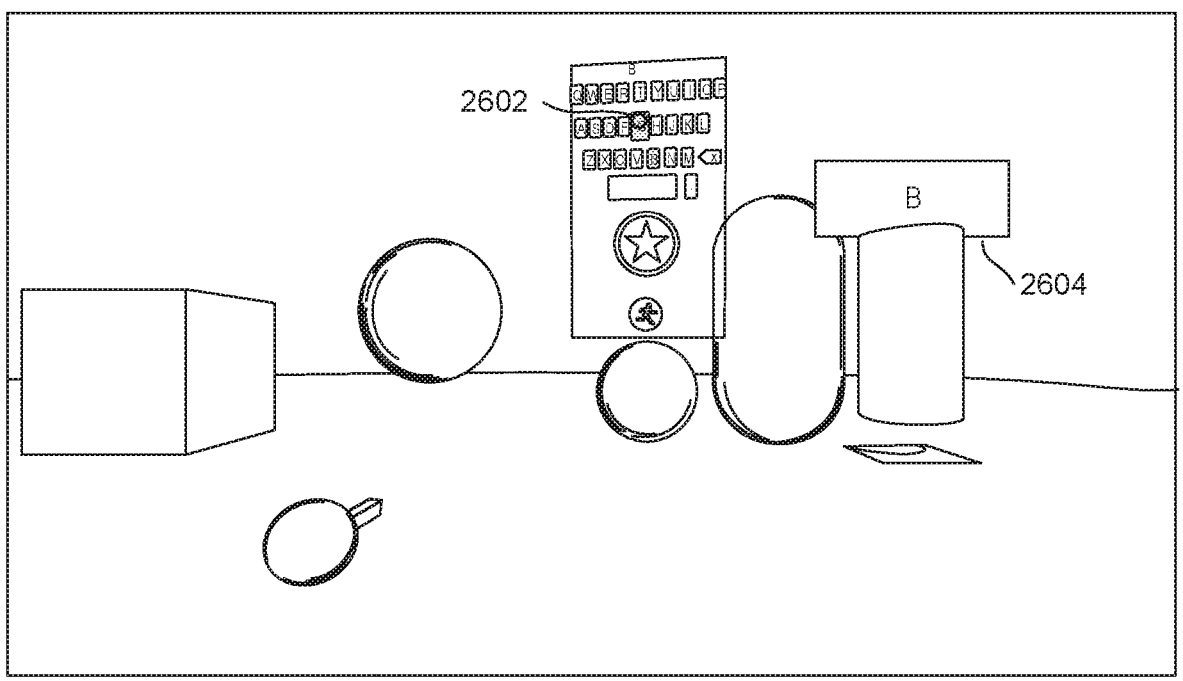
FIG. 26 illustrates use of hover touch to aid in entering text using the keyboard of a virtual mobile device in accordance with an embodiment.

FIG. 26 shows an example implementation, in accordance with an embodiment, of a keyboard within a virtual mobile touch display device. FIG. 26 illustrates that using remote hover touch, the user is able to hover and type text into a text box 2604 using the keyboard of the virtual mobile device. In one embodiment, the key 2602 above which the remote hover touch cursor is currently hovering, reacts by changing an attribute, such as shade or color. Additionally, the size of the key may be increased when the remote hover cursor is on the key. This enhances the typing experience and helps solve issues related to the size of graphical user interface elements, distance from view point, precision of touching the target etc as well as providing important feedback about what key will be selected if the finger were to go down to touch. In fact, because this is a purely graphical simulation, again, the visual feedback for these alphanumeric input operations can also be repeated within the VW environment, so the user doesn't have to keep looking down.

There are many new benefits that occur from combining 6 DOF tracking with a hover touch controller. This includes the ability to provide additional control over various VW techniques, such as Torchlight. Torchlight is a commonly used technique in VW for selection of 3D objects in a scene. An infinite cone is attached to the 6 DOF tracked hand. As the user moves their hands, the cone falls on different objects. The user can then press a button to select objects that lie within this cone.

Figure 27:
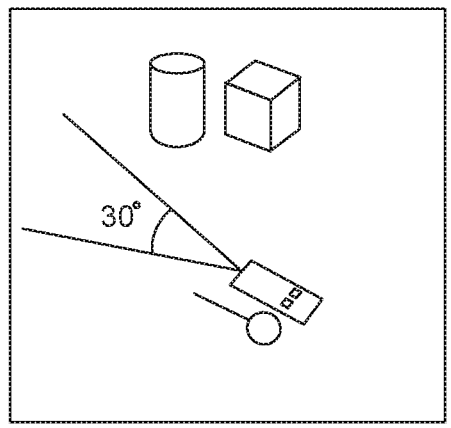
FIG. 27 illustrates use of hover touch to aid in control of a torch lighting operation in accordance with an embodiment.
Figure 27:
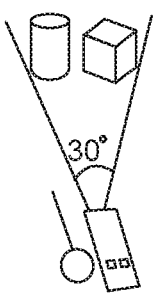
Figure 27:
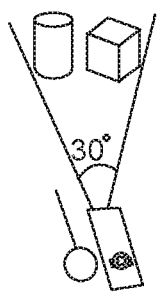
Figure 27:
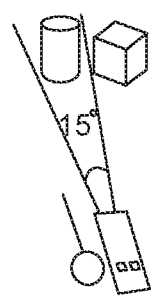

With a collocated virtual mobile touch display device, the user can adjust the aperture of this cone to make it bigger or smaller and fine tune to just fit the 3D object they are interested in, and avoid rest of the objects in the environment. An example of this is shown in FIG. 27, which illustrates an embodiment in which pressing a button on a virtual device, using a remote hove touch controller, is used to adjust the cone aperture using remote hover touch in a 6 DOF hybrid controller. The orientation of the mobile device (and also the cone) is based on the 6 DOF. The width of the cone may be selected by the use of remote hover touch.

Figure 28:
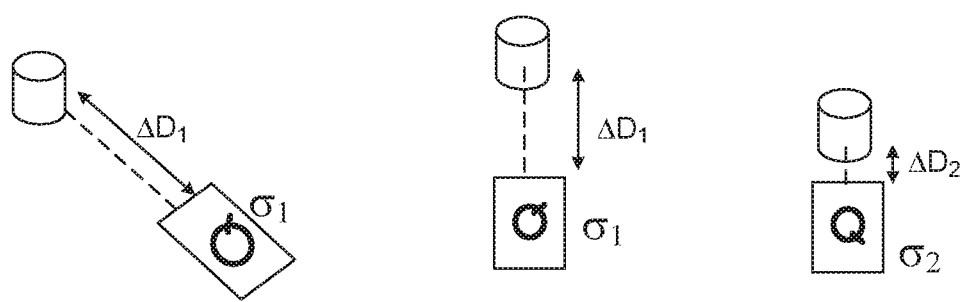
FIG. 28 illustrates use of remote hover touch for a fishing rod operation in accordance with an embodiment.

Much of the challenge in VW environments is placing and orienting objects within a 3D space. Simultaneously controlling at 6 Degrees of Freedom (X,Y,Z, Pitch, Yaw, Roll) of the manipulated 3D object from standing afar has always been challenging. The combination of 6 DOF and remote hover touch in a hybrid device provides additional control. FIG. 28 illustrates what is known as a fishing rod technique. After selection of the object (either via torchlight technique described above or other techniques), the user can now start to rotate their hands to radially move the 3D object. i.e., the distance D1 between the object and tracked hand is maintained as the user rotates. The user can simultaneously touch and modify a dial on the virtual mobile device, reeling the object closer to (to distance D2 as shown in figure). This allows for simultaneously manipulating the X,Y,Z and Pitch, Yaw, Roll of a 3D object within virtual space.

Figure 29:
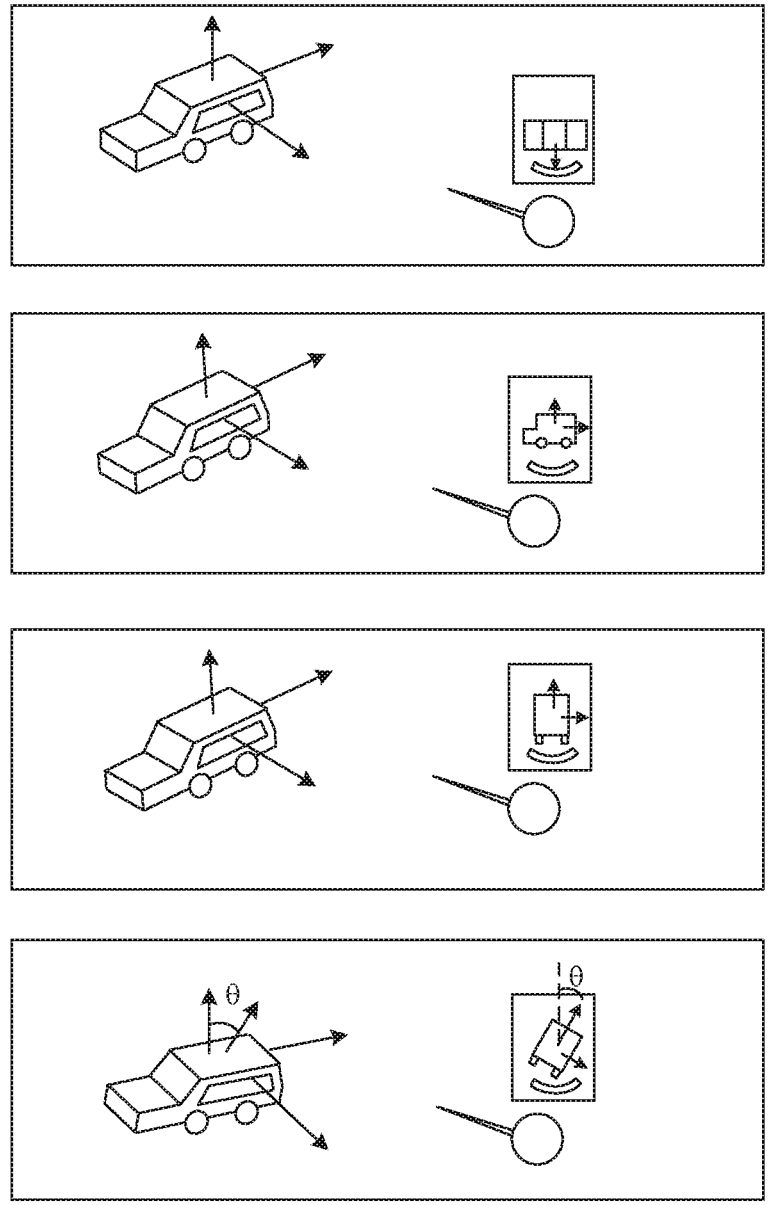
FIG. 29 illustrates loading UI pages on a virtual mobile device in accordance with an embodiment.

FIG. 29 shows yet another example of the power of a hybrid device having 6 DOF and a hover touch controller in accordance with an embodiment. After selection of an object (either via the torchlight technique described above or other techniques), the virtual mobile device can immediately be loaded with UI pages corresponding to that object (equivalent of an app for that project). The user may now use hover-touch controller to manipulate the widgets in these elements.

As shown in the embodiment of FIG. 29, the UI pages associated with the car model is loaded on the virtual mobile device. First, the top view of the car is shown. User swipes to reveal the next page, which is the front view. User then swipes again to reveal the next page, which is the side view. The user then starts rotating a dial at the bottom, which in turn rotates the car model. In a similar manner, many properties such as position, orientation, color, scale, texture etc. can be manipulated from afar with the virtual mobile device.

Figure 30:
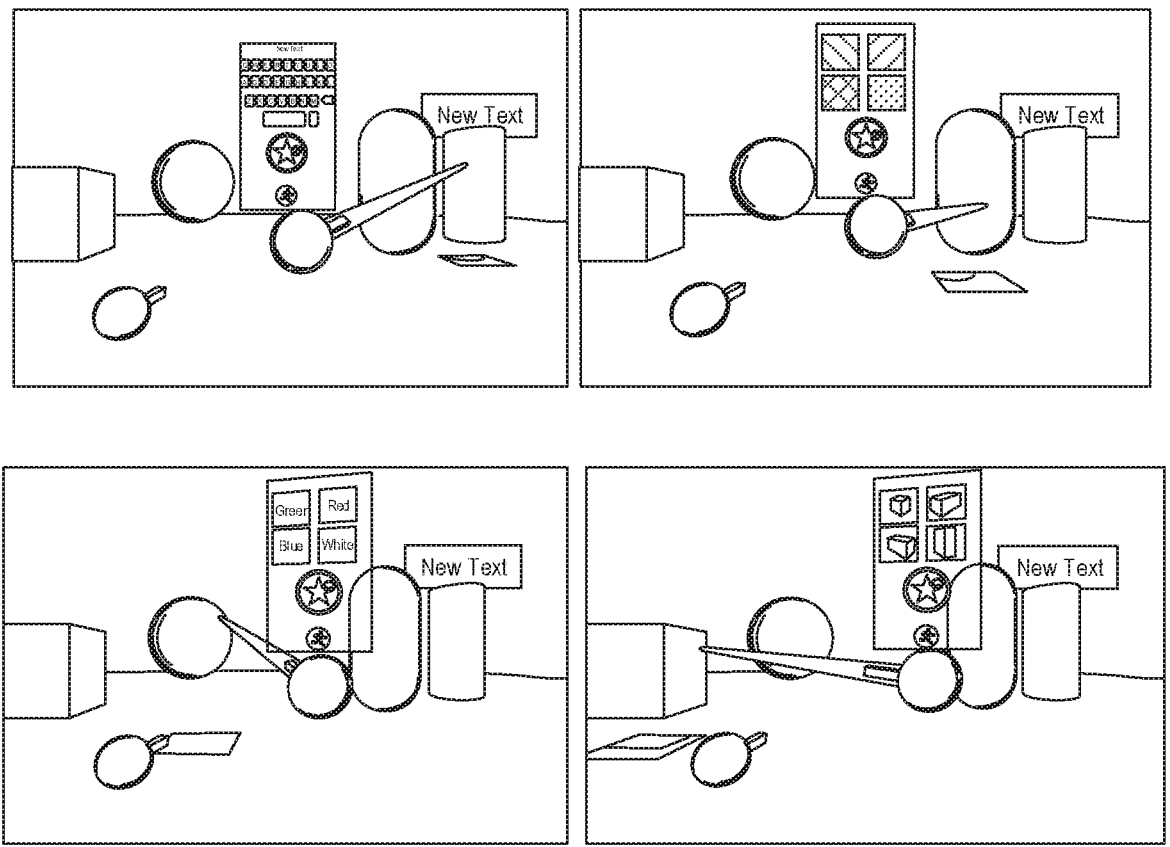
FIG. 30 illustrates adjustment and interaction with widgets of a virtual mobile device in accordance with an embodiment.

FIG. 30 shows an example implementation, in accordance with an embodiment, that illustrates the contextual nature of the virtual mobile touch display device. As the user uses the 6 DOF cursor to cast a ray and select objects within the virtual world (represented by the square underneath the selected object), where the graphical user interface within the virtual mobile touch display device switches to an interface with widgets that are relevant to the selected object. The graphical user interface may be generated by a hover touch UI operating in a HMD or in a computer coupled to a HMD. The user then uses hover touch, on a hover touch controller device with 6 DOF, to select these menu items within the virtual mobile device to modify the characteristics of these objects. For example, the image on top right shows that on selecting the cube, menus related to scaling along x, y, z etc. shows up. The user can use hover touch to select the menu associated with x scale to lengthen the cube.

Figure 31:
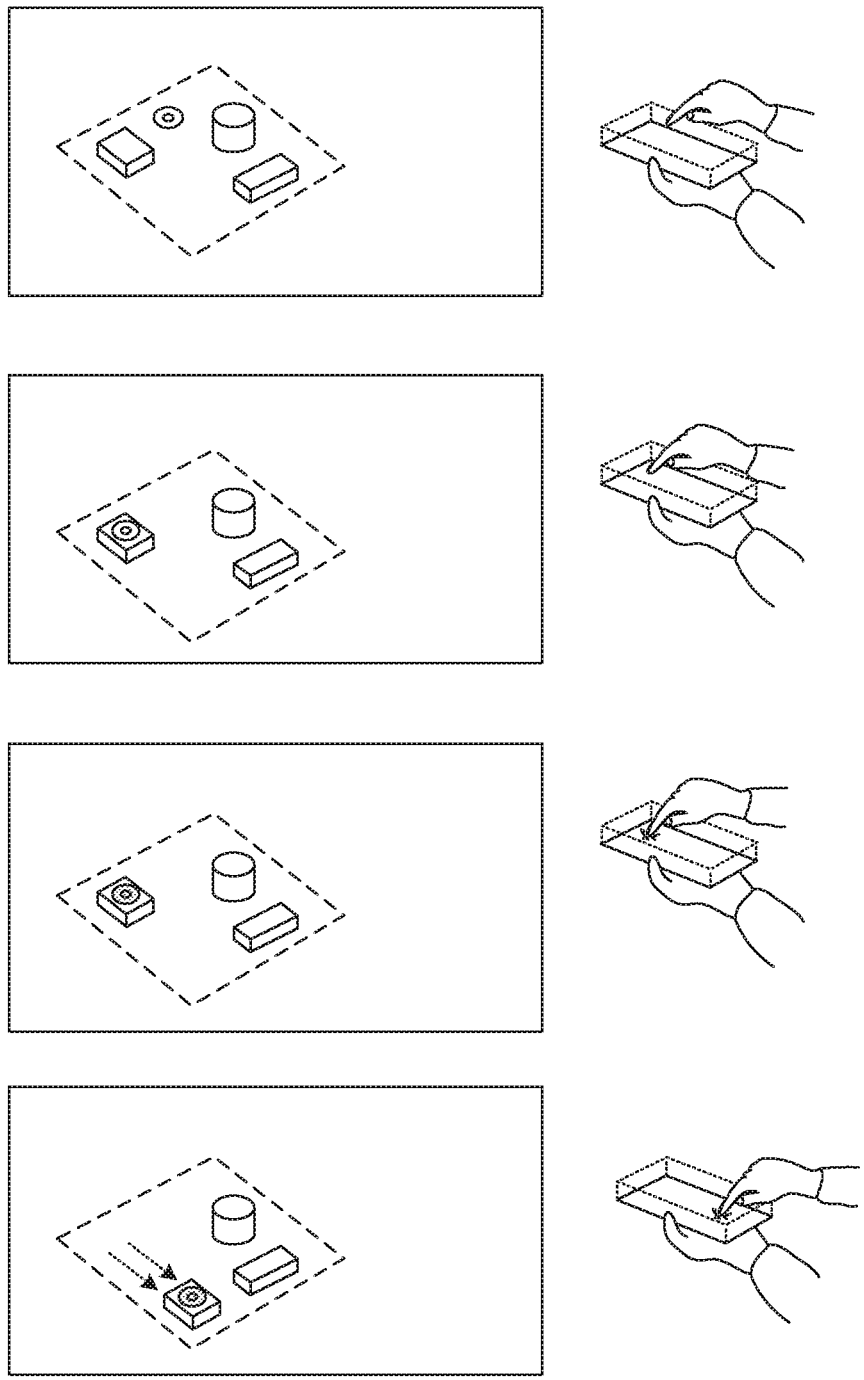
FIG. 31 illustrates manipulation of object coordinates in accordance with an embodiment.

FIG. 31 exemplifies a situation of manipulation in object coordinates in accordance with an embodiment. A virtual selection plane is set up in the 3D environment. This can be done using the 6 DOF tracking, by dragging and placing a virtual plane in position. Alternatively, the same can be done by automatically aligning the virtual plane to be aligned with the face of a 3D object (The cylinder's base in this case). The image plane maps interactions 1:1 from the remote hover touch. When the user approaches and enters the hover zone, a remote hover touch cursor shows up in this virtual selection plane. The user can then move around until they are aligned with an object of interest, the square object in this case. Then the user can touch down and drag the object to a desired position in the virtual plane. The beauty of this technique is that we are performing 3D manipulations with a simple 2D interface.

Embodiments corresponding to several advanced use cases will now be described. A hybrid device combining 6 DOF tracking with hover touch to implement the concept of a virtual mobile touch device opens up many possibilities in spatial interaction. The examples provided above mostly only use a subset of the aspects of this combination at a given time. The real power of this combination is when many of these aspects are used simultaneously to perform operations that either couldn't have been performed before, or needed a significant number of steps that increased interaction time and reduced intuitiveness.

One of the biggest promises with VR, AR and MR is the possibility of immersive modeling. For a few decades now, people have been sitting in front of desktop computers with keyboards and mice to build 3D models of products, buildings etc. There is a significant cognitive mismatch in this approach, when a user is building a 3D world via a 2D interface (the monitor). With immersive technologies, and 3D input, users can now build full models in 3D with their hands that is more intuitive and aligned with how people work with real 3D objects in the real world. One of the challenges in immersive modeling is presentation of information and controls. Windows Icons Menus Pointers (WIMP) and hot keys on keyboards provided users lots of control in the 2D metaphor. With immersive modeling, there is no WIMP or keyboard, resulting in challenges for control. The 6 DOF hover touch along with the virtual mobile touch device helps solves a lot these challenges.

Figure 32:
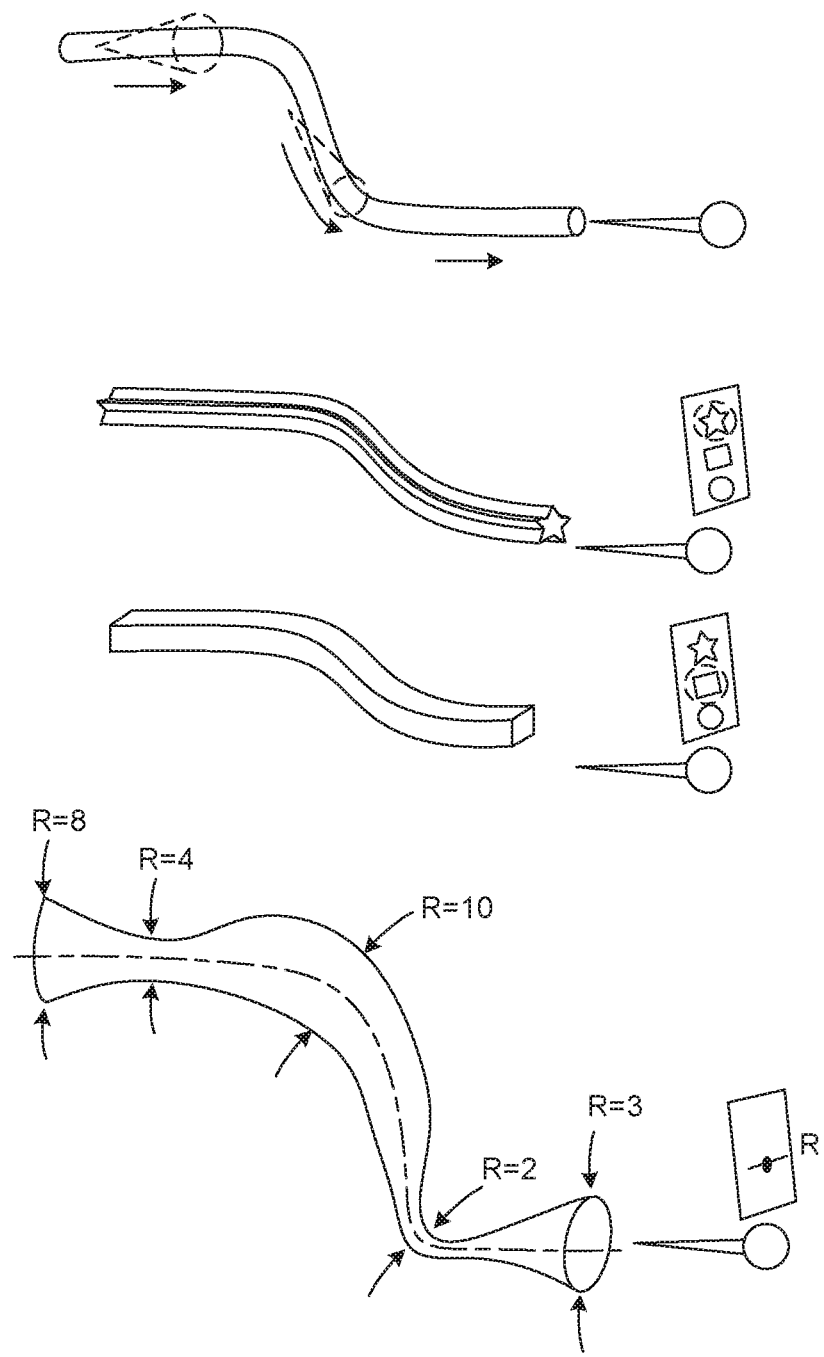
FIG. 32 illustrates a hybrid controller being used for a sweep operation in accordance with an embodiment.

One application for using a hybrid 6 DOF device with a hover touch controller is sweeping. Sweeping is a technique in 3D modeling that is used to create complex 3D shapes. The basis for the technique is sweeping a certain cross section along a certain path. In a 2D metaphor, this is a complicated process, where the user first spends time creating the path, which requires switching to several different viewing angles. The path creation is even more complicated for a truly 3D path that bends and moves in all 3 axes. A profile is then selected and swept along the path. With 6 DOF tracking, users can just move their hands in space to create this path and perform a sweep. The combination of 6 DOF and hover touch and virtual mobile touch device, users can enrich this operation a lot more. Users can on the fly select between different cross sections on the virtual mobile device and sweep them. During the sweep, they can additionally use the virtual mobile touch device to modify parameters such as radius, color, texture, patterns etc., that will in real time affect the swept 3D model. For example, FIG. 32 shows an embodiment illustrating a 6 DOF hover touch being used for the sweep. As the user moves their hands along to create a path, they also simultaneously vary the radius widget on the virtual mobile device. This can result in the advanced 3D model with varying cross section thickness that was built in just 1 stroke. Building this same model in the 2D metaphor would have taken 1 or 2 orders of a magnitude more steps.

Figure 33:
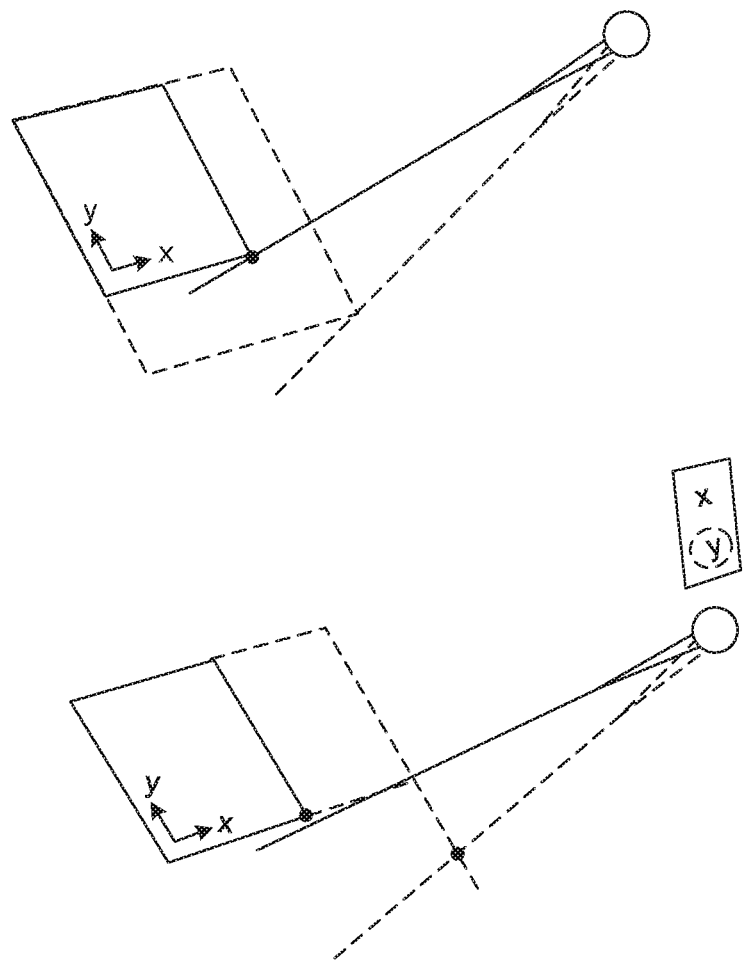
FIG. 33 illustrates implementing a hot key operation on a virtual mobile device.

Another important benefit of combining 6 DOF hover touch with virtual mobile device is that it can be used to achieve the equivalent of hot keys on a keyboard. In a 2D metaphor, users can press hot keys to alter several parameters involved in the operation. For example, pressing the ctrl button and moving the mouse would drag the 3D object along a specific plane. Depending on the shape that is being created, the virtual mobile device can switch to an interface showing the corresponding hot keys. The user can perform their 3D input operation, while simultaneously depressing one of the menu items to implement such hot key interactions. FIG. 33 illustrates this scenario. With just 6 DOF input, users can point (cast a ray), grab a corner, and resize a quad. If the user desires to only resize one of the sides/axes, they can perform the operation while depressing the corresponding menu item on the screen. For example, when the user performs the point and drag with the y menu pressed, even though their hands are making moves in the x and y direction, the quad only resizes along the x, keeping the y measure constant.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or computing devices. In addition, those of ordinary skill in the art will recognize that devices such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. An apparatus comprising:
a touch sensor having a touch surface;
a proximity sensor configured to detect three-dimensional position information within a maximum depth from the touch surface; and
a controller configured to:
monitor the touch sensor and the proximity sensor,
communicate the three-dimensional position information to an external device describing a position of an interaction device with respect to the touch surface,
cause the external device to vary a user interface of the external device as a function of a distance of the interaction device from the touch surface by selecting at least one visualization from among a plurality of navigation visualizations with each corresponding to a respective distance from the touch surface, wherein:
a first visualization corresponds to at least one pre-touch distance, and
a second visualization different from the first visualization corresponds to a touching of the interaction device with the touch surface,
cause the external device to manipulate the at least one visualization to enter an input into a virtual touch display device device, having an orientation, that is displayed on the external device,
wherein the orientation of the virtual touch display device rotates as the apparatus rotates, and
communicate six degree of freedom tracking information,
wherein the orientation of the virtual touch display device is based on the six degree of freedom tracking information, and
the three-dimensional position information of the touch sensor is used to enter the input into the virtual touch display device.

2. The apparatus of claim 1, wherein the apparatus is attached or integrated with the external device.

3. The apparatus of claim 1, wherein:
the apparatus is coupled to a six degree of freedom tracking unit, wherein tracking information on position and orientation of the controller is provided with the three-dimensional position information to the external device; and
the orientation of the virtual touch display device is based on information received from the six degree of freedom tracking unit.

4. The apparatus of claim 3, wherein the user interface of the external device generates the second visualization for touch events in which the interaction device touches the touch surface and the first visualization for pre-touch events when the interaction device hovers away from the touch surface within the maximum depth.

5. The apparatus of claim 4, wherein the first visualization indicates where the interaction device is currently hovering as an indicator of when and where the interaction device will touch the touch surface.

6. A method comprising:
receiving three-dimensional position information describing a position of a finger of a user with respect to a surface of a touch sensor within a maximum depth range from the surface; and
varying a user interface on an external device based at least in part on the three-dimensional position information by:
generating a first visual feedback indicating that a user touches the surface of the touch sensor,
generating a plurality of second visual feedbacks indicating a pre-touch event corresponding to a distance of the finger of the user from the surface of the touch sensor but within the maximum depth range, and
selecting, as a function of the distance, at least one visual feedback from among the plurality of second visual feedbacks, wherein:
the plurality of second visual feedbacks corresponds to at least one pre-touch distance, and
the first visual feedback, different from the plurality of second visual feedbacks, corresponds to a touching of the finger with the surface, and
manipulating at least one of the first visual feedback or the plurality of second visual feedbacks to enter an input into a virtual touch display device, having an orientation, that is displayed on the external device,
wherein the orientation of the virtual touch display device rotates as the touch sensor rotates,
receiving six degree of freedom tracking information from a device supporting the touch sensor,
wherein the orientation of the virtual touch display device is based on the six degree of freedom tracking information, and
the three-dimensional position information of the touch sensor is used to enter the input into the virtual touch display device.

7. The method of claim 6, wherein generating the plurality of second visual feedbacks for the pre-touch event comprises generating navigation information.

8. The method of claim 6, wherein the plurality of second visual feedbacks provides visual feedback of where a finger of a user is currently hovering as an indicator of when and where the finger of the user will touch the surface of the touch sensor.

9. A method comprising:
receiving three-dimensional position information describing a position of a finger of a user with respect to a surface of a touch sensor, wherein the position is determined relative to a plane of the surface and within a maximum threshold depth from the surface;
varying a user interface based at least in part on the three-dimensional position information;
generating a first set of user interface interactions indicating a touch down in which the finger of the user is touching the surface of the touch sensor,
generating a second set of user interface interactions indicating a hover mode in which the finger of the user is spaced away from the surface of the touch sensor but within the maximum threshold depth,
selecting, as a function of a distance of the finger of the user from the surface of the touch sensor, at least one user interface interaction from among the second set of user interface interactions corresponding to a respective distance of the finger of the user from the surface of the touch sensor, wherein:
a first visualization corresponds to at least one pre-touch distance, and
a second visualization different from the first visualization corresponds to a touching of the finger with the surface, and
manipulating at least one of the first visualization or the second visualization to enter an input into a virtual touch display device, having an orientation,
wherein the orientation of the virtual touch display device rotates as the touch sensor rotates, receiving six degree of freedom tracking information from a device supporting the touch sensor, wherein the orientation of the virtual touch display device is based on the six degree of freedom tracking information, and the three-dimensional position information of the touch sensor is used to enter the input into the virtual touch display device.

10. The method of claim 9, wherein the user interface comprises a cursor mode in which a cursor has a first representation for the touch down and a second representation for the hover mode.

11. The method of claim 9, wherein the user interface scales at least one feature of the user interface in the hover mode.

12. The method of claim 9, wherein the user interface provides visual feedback indicating where the finger of the user is currently hovering over the touch sensor as an indicator of when and where the finger of the user will touch the surface of the touch sensor.

13. The method of claim 9, wherein the user interface snaps to a nearest valid widget in the hover mode.

14. The method of claim 9, wherein the user interface reveals a hidden menu in the hover mode.

15. The method of claim 9, wherein children user interfaces are generated in the hover mode.

16. The method of claim 9, wherein a secondary cursor is spawned in the hover mode.

17. The method of claim 9, wherein the user interface is displayed in a heads up display.

18. The method of claim 9, wherein alphanumeric information is entered into the virtual touch display device.

19. The method of claim 9, further comprising receiving six degree of freedom tracking information from a device supporting the touch sensor, wherein a coarse selection of a portion of the user interface is based on the six degree of freedom tracking information and the three-dimensional position information of the touch sensor is used to make a fine grained selection.

* * * * *